(12) United States Patent
Millar

(10) Patent No.: US 11,219,172 B2
(45) Date of Patent: Jan. 11, 2022

(54) DEVICES, SYSTEMS, AND METHODS FOR PROVIDING AND USING ONE OR MORE VALVES IN AN ASSEMBLY LINE GROW POD

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 478 days.

(21) Appl. No.: 15/965,280

(22) Filed: Apr. 27, 2018

(65) Prior Publication Data

US 2018/0359966 A1 Dec. 20, 2018

Related U.S. Application Data

(60) Provisional application No. 62/519,433, filed on Jun. 14, 2017, provisional application No. 62/519,425, (Continued)

(51) Int. Cl.
*A01G 27/00* (2006.01)
*G05D 7/06* (2006.01)
(Continued)

(52) U.S. Cl.
CPC ......... *A01G 27/001* (2013.01); *A01G 27/003* (2013.01); *A01G 31/042* (2013.01);
(Continued)

(58) Field of Classification Search
None
See application file for complete search history.

(56) References Cited

U.S. PATENT DOCUMENTS 2,973,781 A * 3/1961 Cadella ................ A01G 25/165
137/553
3,018,788 A * 1/1962 Perlis ................... A01G 25/162
137/331
(Continued)

FOREIGN PATENT DOCUMENTS

CN 102172204 A 9/2011
CN 102696470 A 10/2012
(Continued)

OTHER PUBLICATIONS

BRIANG6, Grow Box—Automated, Stackable, instructables, published Dec. 1, 2014, retrieved from http://www.instructables.com/id/Stacking-Automated-Grow-Box/.
(Continued)

*Primary Examiner* — Peter M Poon
*Assistant Examiner* — Morgan T Barlow
(74) *Attorney, Agent, or Firm* — Dinsmore & Shohl LLP

(57) ABSTRACT

An assembly line grow pod includes a plurality of fluid lines fluidly coupled between a fluid source and a fluid destination within the assembly line grow pod, a plurality of valves, each coupled to a fluid line such that fluid movement through the fluid lines is selectively controlled by the valves, and a master controller communicatively coupled to the valves. The master controller is programmed to receive information relating to fluid delivery within the assembly line grow pod, determine one or more valves to direct the fluid, determine valve parameters for each of the valves that achieve the fluid direction, and transmit one or more control signals to the valves for directing the fluid within the assembly line grow pod.

18 Claims, 10 Drawing Sheets

Related U.S. Application Data filed on Jun. 14, 2017, provisional application No. 62/519,419, filed on Jun. 14, 2017.

(51) Int. Cl.
  *F04B 23/02* (2006.01)
  *F04B 23/04* (2006.01)
  *F04B 49/03* (2006.01)
  *F04B 49/00* (2006.01)
  *A01G 31/04* (2006.01)
  *F04B 49/22* (2006.01)

(52) U.S. Cl.
  CPC ............ *F04B 23/02* (2013.01); *F04B 23/04* (2013.01); *F04B 49/00* (2013.01); *F04B 49/03* (2013.01); *F04B 49/22* (2013.01); *G05D 7/0623* (2013.01); *F04B 2205/09* (2013.01)

(56) References Cited

U.S. PATENT DOCUMENTS

| | | | | |
|---|---|---|---|---|
| RE27,041 E * | 1/1971 | Hotchkin | ............ | A01G 25/162 |
| | | | | 137/624.2 |
| 7,245,991 B1 | 7/2007 | Woytowitz | | |
| 7,457,687 B1 * | 11/2008 | Porter | ................. | A01G 25/165 |
| | | | | 137/624.11 |
| 7,772,726 B1 * | 8/2010 | Porter | ................. | A01G 25/165 |
| | | | | 307/328 |
| 9,169,944 B1 * | 10/2015 | Dunn | .................... | B05B 7/1209 |
| 9,547,313 B2 * | 1/2017 | Nickerson | ........... | G05D 7/0617 |
| 9,560,813 B2 * | 2/2017 | Hassle | ................. | A01G 31/042 |
| 9,577,415 B1 * | 2/2017 | Veloskey | .................. | H02G 3/14 |
| 9,675,014 B2 * | 6/2017 | Hassle | .................... | A01C 21/00 |
| 2006/0032942 A1 * | 2/2006 | Marandi | ............... | A01G 25/06 |
| | | | | 239/200 |
| 2007/0293990 A1 * | 12/2007 | Alexanain | .............. | A01G 25/16 |
| | | | | 700/284 |
| 2008/0027587 A1 * | 1/2008 | Nickerson | ............ | A01G 25/16 |
| | | | | 700/284 |
| 2008/0288116 A1 * | 11/2008 | Nickerson | ............. | A01G 25/16 |
| | | | | 700/284 |
| 2009/0231102 A1 * | 9/2009 | Hyde | .................... | A01G 9/006 |
| | | | | 340/10.1 |
| 2009/0271045 A1 * | 10/2009 | Savelle, Jr. | .......... | A01G 25/167 |
| | | | | 700/284 |
| 2010/0042234 A1 * | 2/2010 | May | ......................... | A01G 7/00 |
| | | | | 700/90 |
| 2010/0145530 A1 * | 6/2010 | Nickerson | ............ | A01G 25/167 |
| | | | | 700/284 |
| 2011/0093123 A1 * | 4/2011 | Alexanian | .............. | A01G 25/16 |
| | | | | 700/284 |
| 2012/0137578 A1 | 6/2012 | Bradford et al. | | |
| 2012/0239211 A1 * | 9/2012 | Walker | ................... | A01G 25/16 |
| | | | | 700/284 |
| 2013/0173070 A1 | 7/2013 | Tennyson | | |
| 2013/0185997 A1 * | 7/2013 | Trofe | ................... | A01G 27/005 |
| | | | | 47/79 |
| 2013/0247462 A1 * | 9/2013 | Leslie | .................... | A01G 9/247 |
| | | | | 47/82 |
| 2014/0172180 A1 * | 6/2014 | Woytowitz | ............ | A01G 25/16 |
| | | | | 700/284 |
| 2014/0174374 A1 * | 6/2014 | Lari | ..................... | A01K 63/003 |
| | | | | 119/245 |
| 2014/0261213 A1 * | 9/2014 | Stiles, Jr. | ............. | A01K 63/042 |
| | | | | 119/245 |
| 2015/0048082 A1 * | 2/2015 | Galal | .................. | B65D 21/083 |
| | | | | 220/4.12 |
| 2015/0118203 A1 * | 4/2015 | Boyette | .................... | A61D 7/00 |
| | | | | 424/93.45 |
| 2015/0173304 A1 * | 6/2015 | Davis | .................. | A01K 63/042 |
| | | | | 119/246 |
| 2015/0230418 A1 * | 8/2015 | Woytowitz | ............ | A01G 25/16 |
| | | | | 700/284 |
| 2016/0174531 A1 * | 6/2016 | Boothe | ............... | F04D 13/0686 |
| | | | | 119/260 |
| 2016/0202708 A1 * | 7/2016 | Hurst | ...................... | F16K 1/221 |
| | | | | 137/487.5 |
| 2016/0255821 A1 * | 9/2016 | Castranova | ........... | A01K 61/95 |
| 2017/0049061 A1 | 2/2017 | Khabbaz | | |
| 2017/0049082 A1 * | 2/2017 | Kim | ........................ | A01G 31/02 |
| 2017/0196176 A1 * | 7/2017 | Griffin | ................... | A01G 7/045 |
| 2017/0265408 A1 | 9/2017 | McGowan et al. | | |
| 2017/0348736 A1 * | 12/2017 | Marino | ................ | B05B 7/2443 |
| 2018/0007845 A1 | 1/2018 | Martin | | |
| 2018/0042186 A1 | 2/2018 | Kop | | |
| 2018/0042188 A1 * | 2/2018 | Khabbaz | ................ | H04B 10/80 |
| 2019/0216060 A1 * | 7/2019 | Kijima | ................... | A01K 61/50 |
| 2020/0037526 A1 * | 2/2020 | Sperry | ................... | A01G 9/025 |

FOREIGN PATENT DOCUMENTS

| | | |
|---|---|---|
| CN | 105104158 A | 12/2015 |
| WO | 2016/147195 A1 | 9/2016 |

OTHER PUBLICATIONS

Bluelab PeriPod L3, retrieved from https://growershouse.com/bluelab-peripod-l3 on Apr. 9, 2018.

International Search Report and Written Opinion pertaining to International Application No. PCT/US2018/031079 dated Jul. 20, 2018.

Communication Pursuant to Article 9 4(3) EPC pertaining to European Patent Application No. 18730184.1, dated Jul. 28, 2020, 8 pages.

Chinese Office Action cited in Chinese Application No. 201880006701.2 dated Apr. 30, 2021, 20 pages.

\* cited by examiner

DEVICES, SYSTEMS, AND METHODS FOR PROVIDING AND USING ONE OR MORE VALVES IN AN ASSEMBLY LINE GROW POD

CROSS REFERENCE TO RELATED APPLICATION

This application claims the benefit of U.S. Provisional Application Ser. No. 62/519,433, filed on Jun. 14, 2017; U.S. Provisional Application Ser. No. 62/519,425, filed on Jun. 14, 2017; and U.S. Provisional Application Ser. No. 62/519,419, filed on Jun. 14, 2017, which are incorporated by reference in their respective entireties.

TECHNICAL FIELD

Embodiments described herein generally relate to systems and methods for controlling one or more components of an assembly line grow pod and, more specifically, to use of a valve control module in a modular control interface to control valves in an assembly line grow pod.

BACKGROUND

Industrial grow pods that are used to continuously grow crops may utilize an assembly line of carts that continuously traverse a track as plant seeds are planted, grown, and harvested, and then continue to traverse the track as the carts (and/or trays thereon) are cleaned and washed to repeat the process. To ensure smooth operation of the industrial grow pod, it may be necessary to ensure that fluids that are supplied within the grow pod (such as water, nutrients, ambient air conditions, and the like) are adequately directed to a particular location, are adequately pressurized, and/or the like. Current solutions may provide watering and nutrient distribution, but often fail to provide customized nutrient distribution.

SUMMARY

Devices, systems, and methods for providing and using one or more valves in an assembly line grow pod are disclosed. One embodiment includes an assembly line grow pod including a plurality of fluid lines fluidly coupled between a fluid source and a fluid destination within the assembly line grow pod, a plurality of valves, each valve of the plurality of valves fluidly coupled to a fluid line of the plurality of fluid lines such that fluid movement through the plurality of fluid lines is selectively controlled by the plurality of valves, and a master controller communicatively coupled to the plurality of valves. The master controller is programmed to receive information relating to fluid delivery within the assembly line grow pod, determine one or more valves of the plurality of valves to direct the fluid, determine valve parameters for each of the one or more valve that achieve the fluid direction, and transmit one or more control signals to the one or more valves for directing the fluid within the assembly line grow pod.

In another embodiment, a valve in an assembly line grow pod includes a valve inlet port fluidly coupled to an assembly line grow pod fluid source via a first one or more fluid lines disposed between the valve inlet port and the assembly line grow pod fluid source, a valve outlet port fluidly coupled to an assembly line grow pod fluid destination via a second one or more fluid lines disposed between the valve outlet port and the fluid destination, the valve outlet port further fluidly coupled to the valve inlet port, an actuator disposed between the valve inlet port and the valve outlet port such that the actuator actuates to selectively control fluid flow in a fluid path between the valve inlet port and the valve outlet port, and a housing. The housing includes a processing device communicatively coupled to the actuator and to a master controller of the assembly line grow pod and a non-transitory, processor-readable storage medium communicatively coupled to the processing device. The non-transitory, processor-readable storage medium includes one or more instructions thereon that, when executed, cause the processing device to receive an instruction from the master controller and cause the actuator to open or close the fluid path between the valve inlet port and the valve outlet port in accordance with the instruction.

In yet another embodiment, a method of installing a valve in an assembly line grow pod includes providing the assembly line grow pod having a fluid source and a fluid destination, disposing the valve in the assembly line grow pod between the fluid source and the fluid destination and fluidly coupling the valve to a first fluid line fluidly coupled to the fluid source and a second fluid line fluidly coupled to the fluid destination such that the valve, when operated, selectively controls movement of a fluid flow in the first fluid line and the second fluid line from the fluid source to the fluid destination, and communicatively coupling the valve to a valve control module of a master controller within the assembly line grow pod such that the valve receives instructions from the valve control module for selectively controlling movement of the fluid.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include devices, systems, and methods for providing and operating one or more valves in an assembly line grow pod. The assembly line grow pod may include a plurality of carts that follow a track and have one or more trays for holding seeds and/or plants. The valves, in addition to one or more other components in the assembly line grow pod, direct water, nutrients, ambient air conditions, and/or the like to particular areas of the assembly line grow pod to ensure optimum growth of the seeds and/or plants as the trays traverse the track. The valves and the one or more other components of the assembly line grow pod are controlled by a master controller.

Specific control of the valves may be performed by one or more hot swappable modules (e.g., a hot swappable valve control module) that are inserted in a modular control interface of the master controller. In order for the various modules to be hot swappable, the devices, systems and methods described herein are utilized to ensure uninterrupted functioning of the assembly line grow pod when particular modules are removed from the modular control interface of the master controller. As such, the devices, systems, and methods described herein provide functionality to control at least a portion of the valves in the assembly line grow pod to ensure that the assembly line grow pod continues to function as particular modules are swapped out. The devices, systems, and methods for providing and using valves in an assembly line grow pod, as well as an assembly line grow pod incorporating the same will be described in more detail below.

Figure 1A:
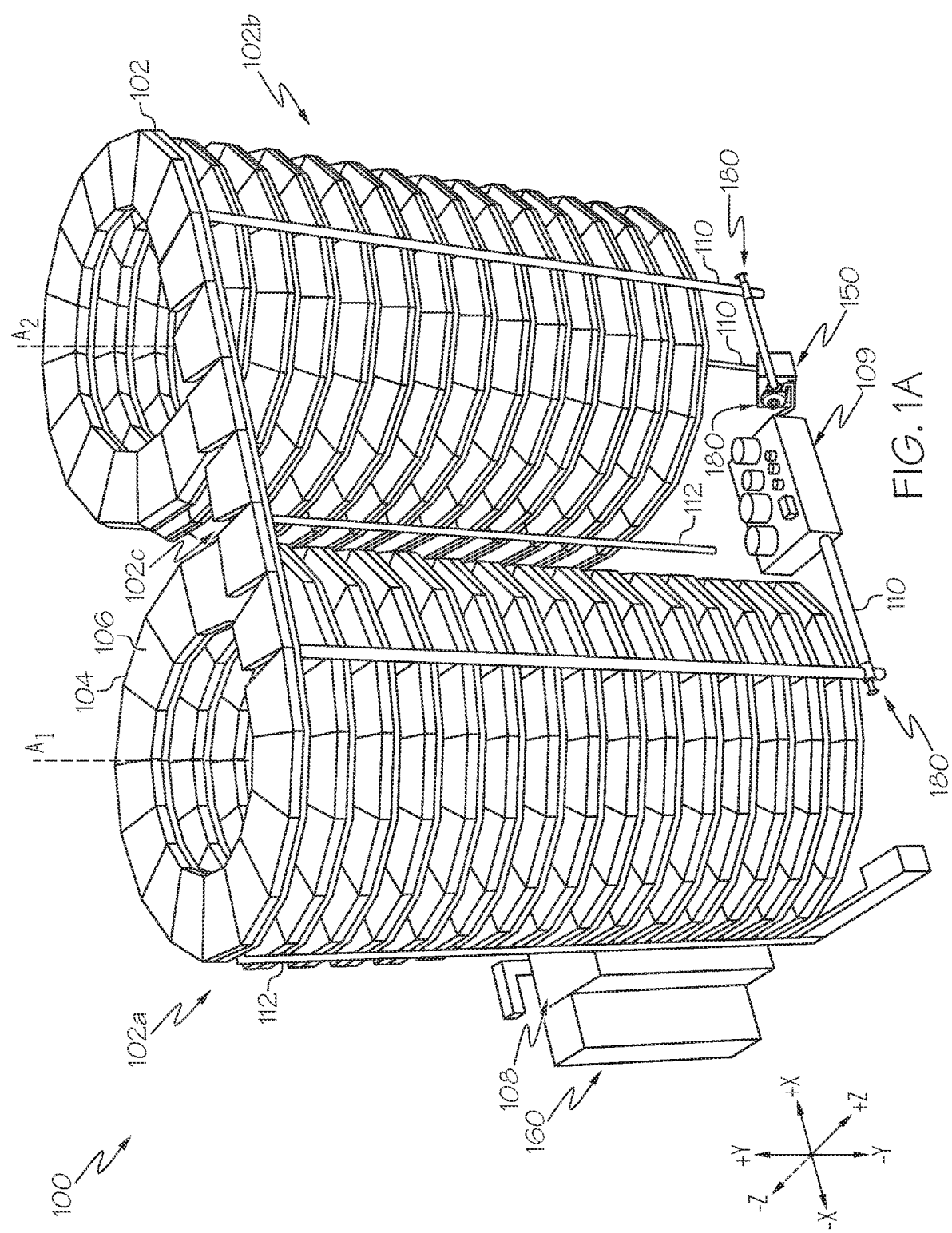
FIG. 1A schematically depicts a front perspective view of an illustrative assembly line grow pod having a master controller according to one or more embodiments shown and described herein.
Figure 1B:
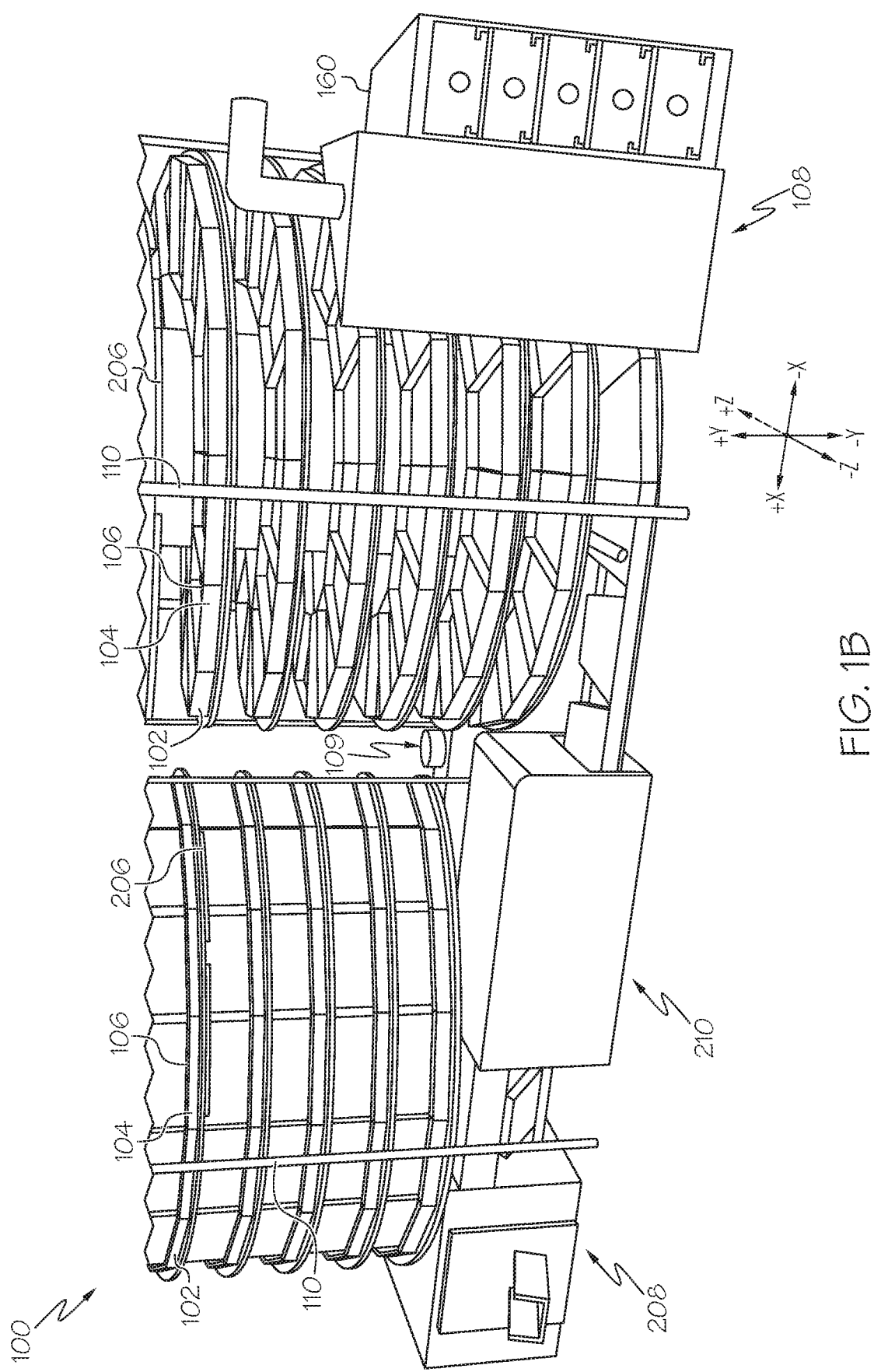
FIG. 1B schematically depicts a rear perspective view of a portion of an illustrative assembly line grow pod having a master controller according to one or more embodiments shown and described herein.

An illustrative industrial grow pod that allows for the continuous, uninterrupted growing of crops is depicted herein. Particularly, FIG. 1A depicts a front perspective view of an illustrative assembly line grow pod 100 having a master controller according to one or more embodiments shown and described herein. In addition, FIG. 1B depicts a rear perspective view of a portion of the assembly line grow pod 100. As illustrated in FIGS. 1A and 1B, the assembly line grow pod 100 may include a track 102 that holds one or more carts 104. Referring particularly to FIG. 1A, the track 102 may include at least an ascending portion 102a, a descending portion 102b, and a connection portion 102c. The track 102 may wrap around (e.g., in a counterclockwise direction, as shown in FIG. 1A) a first axis $A_1$ such that the carts 104 ascend upward in a vertical direction (e.g., in the +y direction of the coordinate axes of FIG. 1A). The connection portion 102c may be relatively level (although this is not a requirement) and is utilized to transfer carts 104 to the descending portion 102b. The descending portion 102b may be wrapped around a second axis $A_2$ (e.g., in a counterclockwise direction, as shown in FIG. 1A) that is substantially parallel to the first axis $A_1$, such that the carts 104 may be returned closer to a ground level.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

Referring to FIG. 1A, supported on each one of the carts 104 is a tray 106. The tray 106 may generally contain one or more components for holding seeds as the seeds germinate and grow into plants as the cart 104 traverses the ascending portion 102a, the descending portion 102b, and the connection portion 102c of the track 102 of the assembly line grow pod 100. The seeds may be planted, allowed to grow, and then may be harvested by various components of the assembly line grow pod 100, as described in greater detail herein. In addition, the seeds (and thereafter the shoots and plants) within the trays 106 may be monitored, provided with water, nutrients, environmental conditions, light, and/or the like to facilitate growing.

Also depicted in FIGS. 1A and 1B is a master controller 160. The master controller 160 may include, among other things, control hardware for controlling various components of the assembly line grow pod 100, as described in greater detail herein. The master controller 160 may be arranged as a modular control interface that receives a plurality of hot-swappable control modules, as described in greater detail herein. One module in the master controller 160, which may be fixed or hot-swappable, may be the valve control module.

Coupled to the master controller 160 is a seeder component 108. The seeder component 108 may be configured to place seeds in the trays 106 supported on the one or more carts 104 as the carts 104 pass the seeder component 108 in the assembly line. Depending on the particular embodiment, each cart 104 may include a single section tray 106 for receiving a plurality of seeds. Some embodiments may include a multiple section tray 106 for receiving individual seeds in each section (or cell). In the embodiments with a single section tray 106, the seeder component 108 may detect the presence of the respective cart 104 and may begin laying seed across an area of the single section tray 106. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray 106 is utilized with one or more of the carts 104, the seeder component 108 may be configured to individually insert seeds into one or more of the sections of the tray 106. Again, the seeds may be distributed on the tray 106 (or into individual cells) according to a desired number of seeds, a desired area the seeds should cover, a desired depth of seeds, etc.

Referring to FIG. 1A, the assembly line grow pod 100 may also include a watering component 109 coupled to one or more water lines 110 via one or more pumps 150 and/or one or more valves 180 in some embodiments. While only a single pump 150 is depicted in FIG. 1A, it should be understood that the assembly line grow pod 100 may incorporate a plurality of pumps 150 in some embodiments.

Likewise, while a plurality of valves 180 are depicted in FIG. 1A, it should be understood that the assembly line grow pod 100 may incorporate a single valve 180 in some embodiments. The watering component 109, the one or more pumps 150, the one or more valves 180, and the one or more water lines 110 may distribute water and/or nutrients to one or more trays 106 at particular areas of the assembly line grow pod 100.

For example, the one or more water lines 110 may extend between the watering component 109 and one or more watering stations arranged at particular locations within the assembly line grow pod 100 such that the pumps 150 connected in line with the water lines 110 pump water and/or nutrients to the one or more watering stations and the one or more valves 180 direct flow of the water and/or nutrients to the one or more watering stations. As a cart 104 passes a watering station, a particular amount of water may be provided to the tray 106 supported by the cart 104. For example, seeds may be sprayed at a watering station to reduce buoyancy and then flooded. Additionally, water usage and consumption may be monitored at a watering station and data may be generated that corresponds to such water usage and consumption. As such, when the cart 104 reaches a subsequent watering station along the track 102 in the assembly line grow pod 100, the data may be utilized to determine an amount of water to supply to the tray 106 at that time.

In addition, the watering component 109 is communicatively coupled to the master controller 160 (particularly a valve control module therein, as described in greater detail herein) such that the master controller 160 provides control signals to the watering component 109 and/or receives status signals from the watering component 109. As a result of this providing and receiving of signals, the master controller 160 can effectively direct the watering component 109 to provide fluid via one or more water lines 110 fluidly coupled to the watering component 109, particularly fluid having one or more delivery characteristics, as described in greater detail herein.

Also depicted in FIG. 1A are airflow lines 112, which may also be fluidly connected to one or more air pumps and/or one or more air valves (not shown in FIG. 1A). Specifically, the one or more air pumps may be pumps that are similar to pumps 150, but are coupled to the airflow lines 112 to deliver air to one or more portions of the assembly line grow pod 100. In addition, the one or more air valves may be valves that are similar to valves 180, but are coupled to the airflow lines 112 to direct airflow to one or more portions of the assembly line grow pod 100. The air may be delivered, for example, to control a temperature of the assembly line grow pod 100 or an area thereof, a pressure of the air in the assembly line grow pod 100 or an area thereof, control a concentration of carbon dioxide ($CO_2$) in the air of the assembly line grow pod 100 or an area thereof, control a concentration of oxygen in the air of the assembly line grow pod 100 or an area thereof, control a concentration of nitrogen in the air of the assembly line grow pod 100 or an area thereof, and/or the like.

Accordingly, the airflow lines 112 may distribute the airflow at particular areas in the assembly line grow pod 100 to facilitate control. As such, the airflow lines 112 may be fluidly coupled to a pump and/or a valve and may further be fluidly coupled between an air source and a target air delivery area. In addition, sensors may sense characteristics (e.g., a concentration, a pressure, a temperature, flow velocity, and/or the like) and may generate data and/or signals corresponding to the sensed characteristics, which may be used for further control.

Referring to FIG. 1B, additional components of the assembly line grow pod 100 are illustrated, including (but not limited to) one or more lighting devices 206, a harvester component 208, and a sanitizer component 210. As described above, the seeder component 108 may be configured to seed the trays 106 of the carts 104. Still referring to FIG. 1A, the lighting devices 206 may provide light waves that may facilitate plant growth at various locations throughout the assembly line grow pod 100 as the carts 104 traverse the track 102. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are lighted, watered, and provided nutrients, the carts 104 traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester component 208, modifications to a recipe may be made for that particular cart 104 until the cart 104 reaches the harvester component 208. Conversely, if a cart 104 reaches the harvester component 208 and it has been determined that the plants in the cart 104 are not ready for harvesting, the assembly line grow pod 100 may commission the cart 104 for another lap. This additional lap may include a different dosing of light, water, nutrients, etc. and the speed of the cart 104 could change, based on the development of the plants on the cart 104. If it is determined that the plants on a cart 104 are ready for harvesting, the harvester component 208 may harvest the plants from the trays 106.

Referring to FIG. 1B, the harvester component 208 may cut the plants at a particular height for harvesting in some embodiments. In some embodiments, the tray 106 may be overturned to remove the plants from the tray 106 and into a processing container for chopping, mashing, juicing, and/or the like. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray 106 are clear of plant material, the sanitizer component 210 may remove any particulate matter, plant material, and/or the like that may remain on the cart 104. As such, the sanitizer component 210 may implement any of a plurality of different washing mechanisms, such as high pressure water, high temperature water, and/or other solutions for cleaning the cart 104 and/or the tray 106. As such, the sanitizer component 210 may be fluidly coupled to one or more of the water lines 110 to receive water that is pumped via the one or more pumps 150 and directed via the one or more valves 180 (FIG. 1A) through the water lines 110.

Still referring to FIG. 1B, the tray 106 may be overturned to output the plant for processing and the tray 106 may remain in this position in some embodiments. As such, the sanitizer component 210 may receive the tray 106 in this position, which may wash the cart 104 and/or the tray 106 and return the tray 106 back to the growing position. Once the cart 104 and/or tray 106 are cleaned, the tray 106 may again pass the seeder component 108, which may determine that the tray 106 requires seeding and may begin the process placing seeds in the tray 106, as described herein.

It should be understood that the assembly line grow pod 100 may include additional components not specifically described herein, and the present disclosure is not limited solely to the components described herein. Illustrative additional components may include, but are not limited to, other watering components, other lighting components, other airflow components, growth monitoring components, other harvesting components, other washing and/or sanitizing components, and/or the like.

Control of the various components described hereinabove, as well as components of the assembly line grow pod 100 not specifically described herein, may be completed by a plurality of control modules within the master controller 160. Each control module within the master controller 160 may be particularly configured to control a single component, a plurality of components, portions of one or more components, and/or the like. For example, a valve control module may control operation of one or more valves that direct the flow of fluids, including (but not limited to) water, nutrients, ambient air, and/or the like, such as the one or more valves 180 described herein.

In some embodiments, control of various components of the assembly line grow pod 100 may be managed by a plurality of control modules such that if a particular control module is removed from the master controller 160 (e.g., a valve control module), the remaining control modules within the master controller 160 can still control various functions of the assembly line grow pod 100 (e.g., fluid control functions of the one or more valves 180) so as to avoid an instance where the entire assembly line grow pod 100 (or a portion of the assembly line grow pod 100, such as the valves 180) has to be shut down while a control module is removed, replaced, repaired, or the like.

To ensure that the assembly line grow pod 100 continues to run even as a particular control module is removed from the master controller 160, the master controller 160 may include a control module that acts as an intermediary module, sending and receiving signals from the various components of the assembly line grow pod 100 and relaying such signals between the appropriate control module(s) within the master controller 160. In some embodiments, the control module may include computer hardware and software components that utilize scripting language to translate recipes and other instructions that are received into binary signals that can be transmitted to the other control modules included within the master controller 160 (e.g., a pump control module).

For example, if a determination is made that a particular tray 106 is to be watered by a watering device (e.g., a fluid distribution manifold) and that the tray 106 is passing in a particular period of time, the control module may determine what components (e.g., valves) are needed, prepare binary signals, and relay the binary signals to the various other control modules that control watering at the time at which watering is necessary (e.g., a valve control module). Other particular details regarding the functionality of the various control modules are discussed herein.

While the present disclosure generally relates to a hot swappable or removably insertable control module and/or a hot swappable or removably insertable valve control module, the present disclosure is not restricted to such. In some embodiments, the control module and/or the valve control module may individually be fixed within the master controller 160 such that they are not removably insertable or hot swappable like the various other modules. As such, the control module and/or the valve control module may always be available to function within the master controller 160 as described herein.

Figure 2:
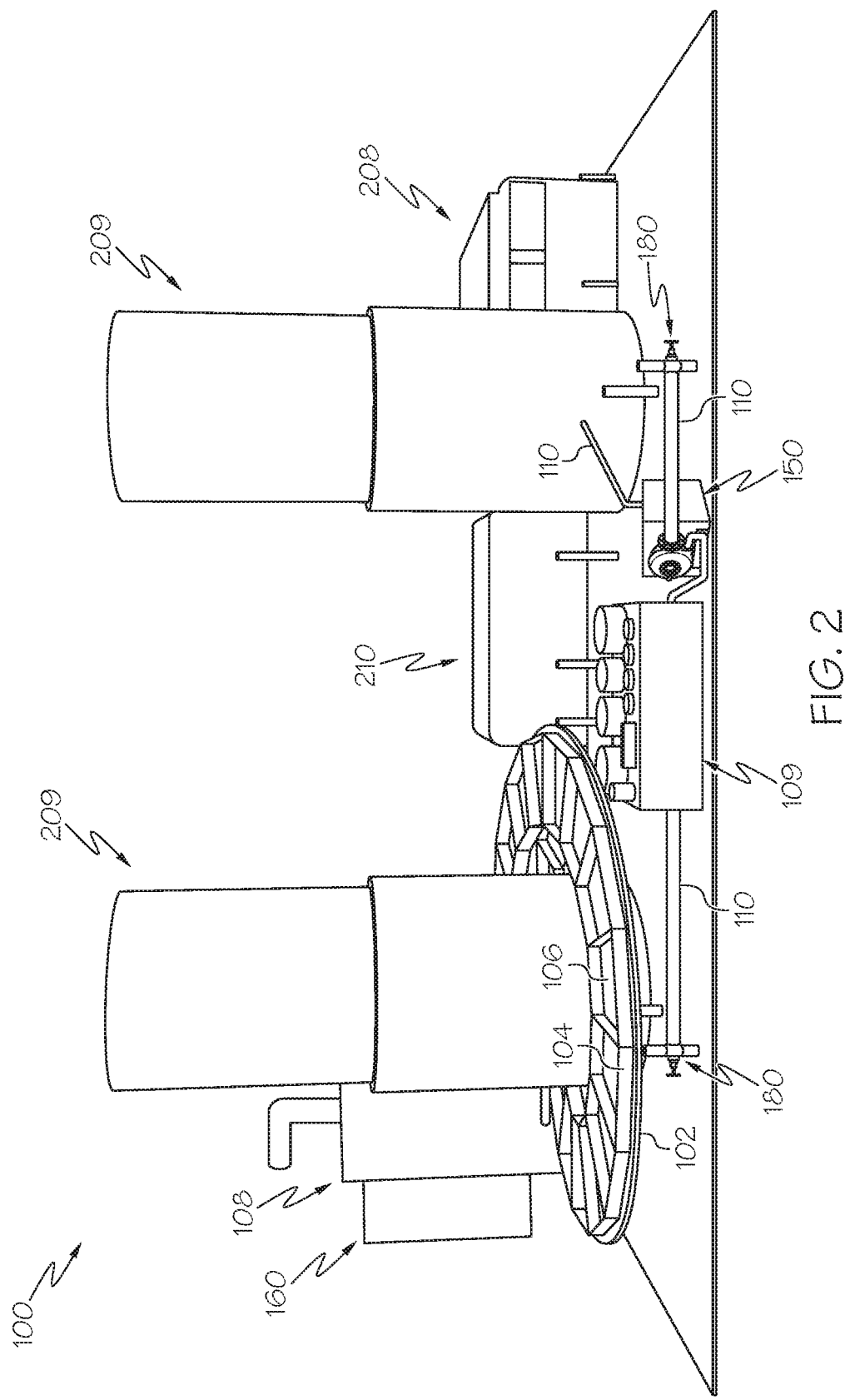
FIG. 2 schematically depicts a front perspective view of an illustrative assembly line grow pod having a master controller with portions of a track removed for purposes of illustrating additional components of the assembly line grow pod according to one or more embodiments shown and described herein.

In addition to the various components described hereinabove with respect to FIGS. 1A and 1B, the assembly line grow pod 100 may further include additional components that are specifically related to storing fluid, moving fluid, distributing fluid, pressurizing fluid, combining fluids, and/or the like. For example, FIG. 2 schematically depicts a front perspective view of an illustrative assembly line grow pod having a master controller 160 with portions of a track 102 removed for purposes of illustrating additional components of the assembly line grow pod 100. More specifically, FIG. 2 depicts a plurality of fluid holding tanks 209.

The fluid holding tanks 209 may generally be storage tanks that are adapted to hold various fluids, including water, water and nutrient combinations, nutrients, gasses (including oxygen, carbon dioxide, nitrogen, and/or the like). In some embodiments, the fluid holding tanks 209 may be fluidly coupled to one or more of the water lines 110, the one or more pumps 150, the one or more valves 180, the watering component 109, and/or the one or more airflow lines 112 (FIG. 1A) to supply the fluid contained therein to various portions of the assembly line grow pod via the one or more water lines 110 and/or the one or more airflow lines 112 (FIG. 1A) when other components control fluid flow (e.g., the one or more pumps 150 and/or the watering component 109). Still referring to FIG. 2, the fluid holding tanks 209 are otherwise not limited by the present disclosure, and may have any other features or characteristics without departing from the scope of the present disclosure.

More specifically, the watering component 109 may contain or be fluidly coupled to one or more pumps 150 that pump the various fluids to particular areas within the assembly line grow pod from the one or more fluid holding tanks 209 upon receiving instructions from the master controller 160 and the one or more valves 180 may direct the fluid to one or more portions of the assembly line grow pod 100 as needed. For example, the master controller 160 may determine the relative locations of the watering component, the fluid holding tanks 209, the location of where fluid is to be supplied, one or more of the pumps 150 that are fluidly coupled therebetween and/or one or more of the valves 180 that are fluidly coupled therebetween. The master controller 160 may then provide instructions to the valves 180 regarding an opening or closing setting, a time when the valve should be opened or closed, which inputs or outputs in the valve should be opened or closed, and/or the like to effectively move fluid between locations, to ensure a particular fluid concentration, to ensure a particular fluid pressure, to ensure fluid is distributed at a particular time, to ensure a correct fluid amount is delivered, and/or the like.

Figure 3:
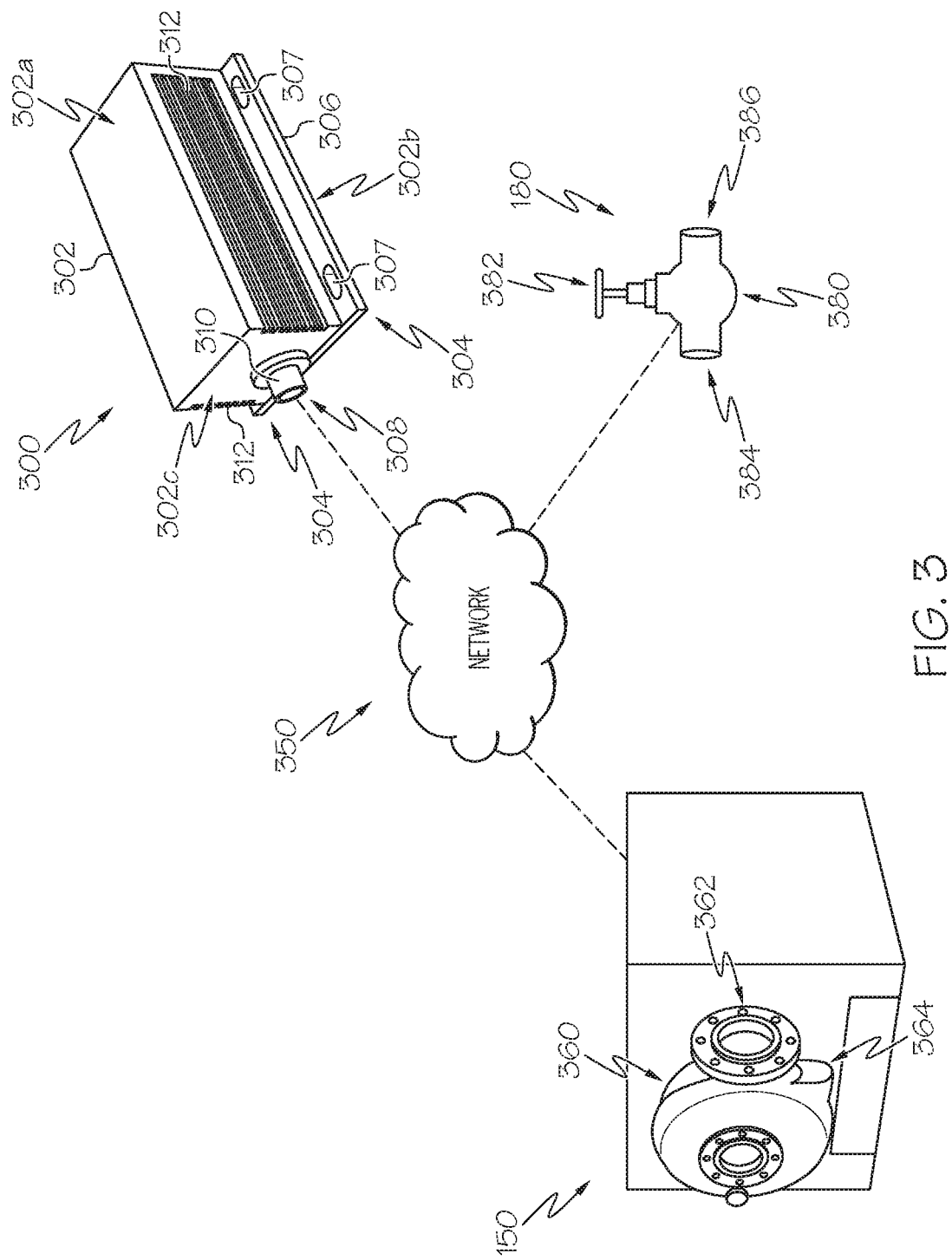
FIG. 3 schematically depicts a valve control module communicatively coupled to a pump and a valve in an assembly line grow pod network according to one or more embodiments shown and described herein.

FIG. 3 schematically depicts a valve control module 300 communicatively coupled to a pump 150 and/or a valve 180 in an assembly line grow pod communications network 350 according to various embodiments. In some embodiments, the valve control module 300 may be communicatively coupled to the pump 150 and the valve 180 via the communications network 350. The communications network 350 may include the internet or other wide area network, a local network, such as a local area network, or a near field network, such as Bluetooth or a near field communication (NFC) network. In some embodiments, the communications network 350 may be a specific valve and pump network whereby each of the pumps 150 and the valves 180 in the assembly line grow pod 100 (FIG. 1A) is communicatively coupled to the valve control module 300. In other embodiments, the communications network 350 may be a specific valve network whereby each of the valves 180 in the assembly line grow pod 100 (FIG. 1A) is communicatively coupled to the valve control module 300. In other embodiments, instead of being connected via the communications network 350, the valve control module 300 may be directly connected to the pump 150 and/or the valves 180 for the purposes of communications.

Still referring to FIG. 3, communications between the valve control module 300, the pump 150 and/or the valve 180 may be such that the valve control module 300 provides transmissions, such as data and signals, to the pump 150 and/or the valve 180 for the purposes of directing operation of the pump 150 and/or the valve 180. That is, the valve control module 300 may direct the pump 150 when to pump fluid, when to stop pumping fluid, how much fluid to pump, a rate at which the fluid should be pumped, the direction of fluid pumping, and/or the like. In addition, the valve control module 300 may direct the valve 180 when to open, when to close, which inlets to open or close, a timing of each opening/closing, and/or the like. In other embodiments, communications between the valve control module 300 and the pump 150 and/or the valve 180 may be such that the valve control module 300 receives feedback from the pump 150 and/or the valve 180. That is, the valve control module 300 may receive data, signals, or the like that are indicative of pump and/or valve 180 operation, including whether the pump 150 and/or the valve 180 are operating correctly or incorrectly, start/stop logs, capacity and rate logs, opening/closing logs. Whether any errors have been detected, a location of the pump 150 and/or the valve 180 within the assembly line grow pod (FIG. 1A) and/or the like. Still referring to FIG. 3, the valve control module 300 may utilize this feedback to make adjustments to the pump 150 and/or the valve 180, to direct other pumps 150 to pump and/or valves 180 to open/close, to communicate with other portions of the master controller 160 (FIG. 1A), and/or the like to ensure that the assembly line grow pod 100 (FIG. 1A) continues to run in an appropriate manner.

Still referring to FIG. 3, the valve control module 300 may generally include a housing 302 supported on a base 306. The base 306 may support the housing 302 within the master controller 160 (FIG. 1B), as described in greater detail herein. The housing 302 of the valve control module 300 may include a plurality of walls, such as, for example, a first side wall 302a, a second side wall 302b, and a third side wall 302c. The first side wall 302a, the second side wall 302b, and the third side wall 302c may extend from the base 306 and at least partially define a cavity that contains various internal components of the valve control module 300, as described in greater detail herein.

In various embodiments, the valve control module 300 may further include an I/O port 308 within the housing 302. The I/O port 308 may have a body 310 that extends from the housing 302 (e.g., from the third side wall 302c of the housing 302) and allows the various internal hardware components of the valve control module 300 to be coupled to external components, such as, for example, various components of the assembly line grow pod 100 (FIG. 1A), including (but not limited to) the master controller 160 (FIG. 1B).

The body 310 of the I/O port 308 may be shaped, sized, and configured to couple to a corresponding bay I/O port to facilitate communicative coupling between the valve control module 300 and the various components of the assembly line grow pod 100 (FIG. 1A), including (but not limited to) the master controller 160, the pump 150, and the valve 180. For example, the body 310 of the I/O port 308 may have a shape that corresponds to a receptacle in a bay I/O port such that the body 310 can be inserted within a bay I/O port, as described in greater detail herein. Still referring to FIG. 3, the I/O port 308 may be a communications port or the like that contains circuitry and/or other mechanical coupling components that allow various hardware components within the valve control module 300 to communicate with one or more other control modules and/or one or more of the various components of the assembly line grow pod 100 (FIG. 1A) via the master controller 160 (FIG. 1B) (e.g., the pump 150 and/or the valve 180), as described in greater detail herein.

In various embodiments, the valve control module 300 may further include one or more features for securing the valve control module 300 to another object, such as, for example, a bay in the master controller 160 (FIG. 1B). For example, the base 306 of the valve control module 300 may extend a distance beyond the various side walls of the housing 302 (e.g., extend beyond the first side wall 302a and the second side wall 302b in the +x/−x directions of the coordinate axes of FIG. 3) to define a plurality of flanges 304 that are insertable into a support mechanism or the like, as described in greater detail herein. The flanges 304 may include one or more structures for securing the base 306 of the valve control module 300.

For example, the flanges 304 may include a plurality of apertures 307 therethrough, as shown in FIG. 3. The plurality of apertures 307 may receive a retention device, such as a screw, a bolt, a clip, and/or the like to secure the base 306, as described in greater detail herein. It should be understood that the apertures 307 are merely an illustrative example of one type of feature that may be used to secure the base 306, and the present disclosure is not limited to such. That is, other securing features are also contemplated and included within the scope of the present disclosure. It should also be understood that the apertures 307 are optional components, and the base 306 may be secured by other means or may not be secured at all in some embodiments.

The various internal components of the valve control module 300 may produce heat as a byproduct of operation. As such, the valve control module 300 may incorporate one or more cooling features therein to dissipate the heat generated by the internal components thereof in some embodiments. For example, the housing 302 of the valve control module 300 may include one or more heat dissipating fins 312 disposed thereon in some embodiments. That is, the first side wall 302a and/or the second side wall 302b may each include the heat dissipating fins 312. Other features for dissipating heat may also be used in addition to (or as an alternative to) the heat dissipating fins 312.

The various internal components of the valve control module 300 may generally provide the functionality of the valve control module 300, as described herein. That is, the internal components of the valve control module 300 may be a computing environment.

Still referring to FIG. 3, the pump 150 may generally include a housing 366 holding a plurality of hardware components that allow the pump 150 to communicate with the valve control module 300. In addition, the pump 150 includes a pumping mechanism 360 that functions to pump fluid from a fluid inlet port 364 to a fluid outlet port 362. More specifically, the fluid inlet port 364 is fluidly coupled to the fluid outlet port 362 and the pumping mechanism 360 is fluidly coupled between the fluid inlet port 364 and the fluid outlet port 362 such that fluid is drawn into the pump 150 via fluid inlet port 364 and moves out of the pump 150 via the fluid outlet port 362 by the pumping mechanism 360.

The pumping mechanism 360 may generally be any mechanism that is used for the purposes of pumping fluid, including a particularly measured amount of fluid. For example, the pumping mechanism 360 may be a positive displacement pump, a centrifugal pump, or a roto-dynamic pump.

Control of the pumping mechanism 360 may be completed by various hardware components within the housing 366, such as, for example, processing devices, non-transitory, processor-readable storage media, communications hardware, and/or the like. The various hardware components may transmit a start signal, a stop signal, a signal to change pump speed, a capacity, a fluid pressure, and/or the like to the pumping mechanism 360. As such, the pumping mechanism 360 may be communicatively coupled to one or more of the various hardware components within the housing 366 for the purposes of transmitting and receiving signals.

Referring to FIGS. 1A and 3, both the fluid inlet port 364 and the fluid outlet port 362 may be fluidly coupled to one or more of the water lines 110 or one or more of the airflow lines 112 of the assembly line grow pod 100. As such, fluid from the water lines 110 or airflow lines 112 coupled to the fluid inlet port 364 may be received by the pumping mechanism 360 and ejected out of the water lines 110 or airflow lines 112 coupled to the fluid outlet port 362.

The fluid inlet port 364 may generally be fluidly coupled (e.g., via the water lines 110 or the airflow lines 112) to a fluid source (e.g., the fluid holding tanks 209 depicted in FIG. 1B). The fluid source may also be referred to as an "assembly line grow pod fluid source" herein, as the fluid source is located within the assembly line grow pod 100. In addition, the fluid outlet port 362 may be fluidly coupled (e.g., via the water lines 110 or the airflow lines 112) to a fluid destination or delivery component (e.g., a fluid delivery manifold, an air duct, etc.). The fluid destination or delivery component may also be referred to as an "assembly line grow pod fluid destination" or "assembly line grow pod delivery component" herein, as the fluid destination or delivery component is located within the assembly line grow pod 100.

It should be understood that the use of the term "inlet" and "outlet" herein is merely illustrative, as the pumping mechanism 360 may be configured to reverse direction, thereby reversing the direction of fluid flow through the fluid inlet port 364 and the fluid outlet port 362 in some embodiments. This fluid coupling of the fluid outlet port 362, and the fluid inlet port 364 allows the pump 150 to be installed at any location within the assembly line grow pod 100, as described in greater detail herein.

In operation, the pump 150 may receive one or more signals and/or data from the valve control module 300 and/or another module, determine various pump parameters (e.g., flow rate, direction of flow, capacity, pressure of fluid provided, type of fluid provided, distance from fluid source and/or fluid delivery component, etc.) from the signals and/or data, and direct the pumping mechanism 360 to operate accordingly by drawing fluid in via the fluid inlet port 314 and pushing fluid out via the fluid outlet port 386. The signals and/or data may be received from the valve control module 300 continuously, at particular intervals, only when operation of the pump 150 is needed, and/or the like.

The valve 180 may generally include a housing 380 holding a plurality of hardware components that allow the valve 180 to communicate with the valve control module 300 and/or to function in lieu of the valve control module 300 (e.g., to continue to open/close as appropriate when the valve control module 300 is removed from the master controller 160 (FIG. 1B)). Still referring to FIG. 3, the valve 180 may include an actuator 382 that functions to open and close the valve 180 to control fluid flow between at least one valve inlet port 384 and at least one valve outlet port 386. As used herein, an "open valve" refers to the valve 180 when the actuator 382 is arranged such that the valve 180 allows fluid to flow along a fluid path from at least one valve inlet port 384 to at least one valve outlet port 386. A "closed valve" refers to the valve 180 when the actuator 382 is arranged such that the valve 180 blocks a fluid path (and thus fluid flow) between any one of the valve inlet ports 384 and any one of the valve outlet ports 386.

It should be understood that the actuator 382 is generally any mechanism, device, or component that is used for the purposes of opening and closing the various valve inlet ports 384 and valve outlet ports 386 of the valve 180. As such, the actuator 382 is not limited by the present disclosure. Illustrative examples of actuators include, but are not limited to, pneumatic actuators, hydraulic actuators, and electric actuators. The actuator 382 may utilize various components such as, but not limited to, plungers, screws, springs, pneumatic components, hydraulic components, electrical components, gears, sensors (e.g., torque sensors, position sensors, limit sensors, etc.), and/or the like for the purposes of opening and closing one or more of the valve inlet ports 384 and/or the valve outlet ports 386. In some embodiments, the actuator 382 may be omitted, particularly in embodiments where the valve is a check valve or a relief valve.

Control of the actuator 382 may be completed by the various hardware components within the housing 380. That is, the various hardware components may transmit an open signal, a close signal, and/or the like to the actuator 382 or various components controlling the actuator 382 to cause the actuator 382 to function accordingly. It should be understood that the hardware components within the housing 380 may be configured to complete all of the processes described herein with respect to the valve control module 300, such that, in the event that the valve control module 300 is hot swappable and swapped out of the master controller 160 (FIG. 1B), the various components within the housing 380 can be utilized to control the various fluid flow control processes described herein. Additional details regarding the hardware components within the housing 380 are described herein with respect to FIG. 4.

Referring to FIGS. 1A and 3, both the valve inlet port 384 and the valve outlet port 386 may be fluidly coupled to one or more of the water lines 110 or one or more of the airflow lines 112. As such, fluid from the water lines 110 or airflow lines 112 coupled to the valve inlet port 384 may be received by the valve 180 and ejected out of the water lines 110 or airflow lines 112 coupled to the valve outlet port 386.

The valve inlet port 384 may generally be fluidly coupled (via the water lines 110 or the airflow lines 112) to a fluid source (e.g., the fluid holding tanks 209 depicted in FIG. 2). In addition, the fluid outlet port 386 may be fluidly coupled (via the water lines 110 or the airflow lines 112) to a fluid delivery component (e.g., a fluid delivery manifold, an air duct, etc.). Either the valve inlet port 384 or the valve outlet port 386 may further be fluidly coupled via the water lines 110 or the airflow lines 112 to a pump 150 such that the pump 150 moves fluid through the valve 180.

It should be understood that while FIG. 3 depicts a single valve inlet port 384 and a single valve outlet port 386 in the valve 180, the present disclosure is not limited to such. That is, the valve 180 may include one or more valve inlet ports 384 and one or more valve outlet ports 386 and may switch fluid flow between any of the ports. In embodiments where the valve 180 includes a plurality of valve inlet ports 384 and/or a plurality of valve outlet ports 386, the valve 180 may further include one or more actuators 382 (including a plurality of actuators 382) to control fluid flow accordingly.

In various embodiments, the valve 180 may be configured such that it is reversible. That is, one or more of the valve inlet ports 384 may be configured to act as an outlet port as needed. Similarly, one or more of the valve outlet ports 386 may be configured to act as an inlet port as needed. Such a configuration allows the valve 180 to be placed in any configuration for directing fluid flow, which provides additional flexibility in directing fluid throughout the assembly line grow pod 100 (FIG. 1A).

In some embodiments, the valve 180 may be a bidirectional valve that can selectively receive and/or block fluid via any one of the valve inlet ports 384 and/or valve outlet ports 386 and selectively allow/restrict fluid to move out of any of the valve inlet ports 384 and/or valve outlet ports 386. In other embodiments, the valve 180 may be a unidirectional valve whereby fluid is only able to flow in a particular direction (e.g., flow in via the valve inlet ports 384 and out via the valve outlet ports 386) and fluid flow cannot be backdriven through the valve 180. Particular examples of bidirectional and unidirectional valves should generally be understood.

In operation, the valve 180 may receive a signal from the valve control module 300 (and/or another component of the master controller 160) and direct the actuator 382 to open or close the valve 180 (or portions thereof, such as one or more of the valve inlet ports 384 and/or the valve outlet ports 386) in response as necessary to direct fluid flow. For example, a valve 180 that has a single valve inlet port 384 and two valve outlet ports 386, each of which is coupled to a water line 110, may have an actuator 382 that controls fluid flow from the valve inlet port 384 to the two valve outlet ports 386 such that flow is blocked from flowing out of the two valve outlet ports 386, fluid is blocked from flowing out of one of the two valve outlet ports 386, or fluid is allowed to flow out of both of the two valve outlet ports 386 to control the direction of fluid flow to block movement of fluid). In embodiments where the valve control module 300 is non-operational (e.g., it has been hot swapped out of the master controller 160), the valve 180 may receive various signals from one or more other components of the assembly line grow pod 100, determine an appropriate actuator 382 positioning, and direct the actuator 382 to operate accordingly.

While FIG. 3 depicts a single valve control module 300, a single pump 150, and a single valve 180, this is merely illustrative. For example, a single valve control module 300 may be coupled to a plurality of pumps 150 and/or a plurality of valves 180. In another example, a plurality of valve control modules 300 may each be connected to a plurality of pumps 150 and/or valves 180. Other combinations of valve control modules 300, pumps 150, and valves 180 are included within the scope of the present disclosure.

Figure 4:
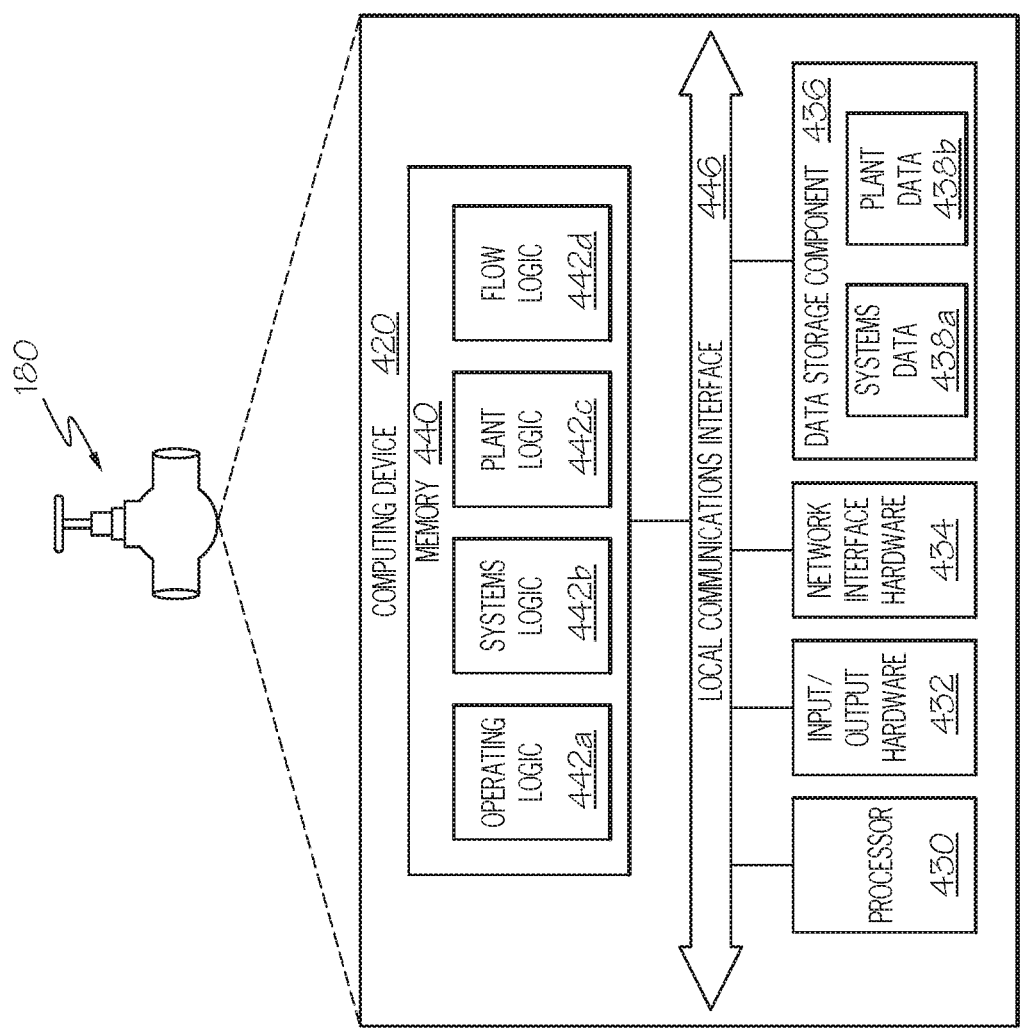
FIG. 4 depicts an illustrative computing environment within a housing of a valve according to one or more embodiments shown and described herein.

FIG. 4 depicts an illustrative computing environment within the valve 180, particularly the housing 380 of the valve 180, according to one or more embodiments. However, as previously described herein, the components depicted in FIG. 4 may also be located within the valve control module 300 (FIG. 3) in some embodiments. As illustrated, the valve 180 may include a computing device 420. The computing device 420 includes a memory component 440, a processor 430, input/output hardware 432, network interface hardware 434, and a data storage component 436 (which stores systems data 438a, plant data 438b, and/or other data).

At least a portion of the components of the computing device 420 may be communicatively coupled to a local interface 446. The local interface 446 is generally not limited by the present disclosure and may be implemented as a bus or other communications interface to facilitate communication among the components of the valve 180 coupled thereto.

The memory component 440 may be configured as volatile and/or nonvolatile memory. As such, the memory component 440 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the valve 180 and/or external to the valve 180. The memory component 440 may store, for example, operating logic 442a, systems logic 442b, plant logic 442c, flow logic 442d, and/or other logic. The operating logic 442a, the systems logic 442b, the plant logic 442c, and flow logic 442d may each include a plurality of different pieces of logic, at least a portion of which may be embodied as a computer program, firmware, and/or hardware, as an example.

The operating logic 442a may include an operating system and/or other software for managing components of the valve 180. As described in more detail below, the systems logic 4421) may monitor and control operations of one or more of the various other control modules and/or one or more components of the assembly line grow pod 100 (FIG. 1A). Still referring to FIG. 4, the plant logic 442c may be configured to determine and/or receive a recipe for plant growth and may facilitate implementation of the recipe via the systems logic 442b and/or the flow logic 442d. The flow logic 442d may be configured to determine valve positions (open/close) of the valve 180 to facilitate fluid movement throughout the assembly line grow pod 100 (FIG. 1A) according to a recipe and/or a need for fluid at a particular location at a particular time, determine an amount of fluid to be directed through the valve, determine a direction of fluid, determine an amount of time to open or close a valve (or a portion thereof), transmit signals and/or data to various other valves, and/or the like.

It should be understood that while the various logic modules are depicted in FIG. 4 as being located within the memory component 440, this is merely an example. For example, the systems logic 442b, the plant logic 442c, and the flow logic 442d may reside on different computing devices. That is, one or more of the functionalities and/or components described herein may be provided by a user computing device, a remote computing device, and/or another control module that is communicatively coupled to the valve 180.

Additionally, while the computing device 420 is illustrated with the operating logic 442a, the systems logic 442b, the plant logic 442c, and the flow logic 442d as separate logical components, this is also an example. In some embodiments, a single piece of logic (and/or several linked modules) may cause the computing device 420 to provide the described functionality.

The processor 430 (Which may also be referred to as a processing device) may include any processing component operable to receive and execute instructions (such as from the data storage component 436 and/or the memory component 440). Illustrative examples of the processor 430 include, but are not limited to, a computer processing unit (CPU), a many integrated core (MIC) processing device, an accelerated processing unit (APU), and a digital signal processor (DSP). In some embodiments, the processor 430 may be a plurality of components that function together to provide processing capabilities, such as integrated circuits (IC) (including field programmable gate arrays (FPGA), application-specific integrated circuits (ASIC)) and the like.

The input/output hardware 432 may include and/or be configured to interface with microphones, speakers, a display, and/or other hardware. That is, the input/output hardware 432 may interface with hardware that provides a user interface or the like. For example, a user interface may be provided to a user for the purposes of adjusting settings (e.g., an amount of nutrients/water to be supplied, a type and amount of ambient air conditions to be supplied, etc.), viewing a status (e.g., receiving a notification of an error, a status of a particular valve or other component, etc.), and/or the like.

The network interface hardware 434 may include and/or be configured for communicating with any wired or wireless networking hardware, including an antenna, a modem, LAN port, wireless fidelity (Wi-Fi) card, WiMax card, ZigBee card, Z-Wave card, Bluetooth chip, USB card, mobile communications hardware, and/or other hardware for communicating with other networks and/or devices. From this connection, communication may be facilitated between the valve 180 and other components of the assembly line grow pod 100 (FIG. 1A), such as, for example, other control modules, the seeder component, the harvesting component, the watering component, the one or more pumps, and/or the like. In some embodiments, the network interface hardware 434 may also facilitate communication between the valve 180 and components external to the assembly line grow pod 100 (FIG. 1A), such as, for example, user computing devices and/or remote computing devices.

Still referring to FIG. 4, the valve 180 may be coupled to a network (e.g., the communications network 350 (FIG. 3)) via the network interface hardware 434. As previously described herein, various other control modules, other computing devices, and/or the like may also be coupled to the network. Illustrative other computing devices include, for example, a user computing device and a remote computing device. The user computing device may include a personal computer, laptop, mobile device, tablet, server, etc. and may be utilized as an interface with a user. As an example, a user may send a recipe to the computing device 420 for at least a partial implementation by the valve 180. Another example may include the valve 180 sending notifications to a user of the user computing device.

Similarly, the remote computing device may include a server, personal computer, tablet, mobile device, etc. and may be utilized for machine to machine communications. As an example, if the assembly line grow pod 100 (FIG. 1A) determines a type of seed being used (and/or other information, such as ambient conditions), the computing device 420 may communicate with the remote computing device to retrieve a previously stored recipe for those conditions. As such, some embodiments may utilize an application program interface (API) to facilitate this or other computer-to-computer communications.

Still referring to FIG. 4, the data storage component 436 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 436 may reside local to and/or remote from the valve 180 and may be configured to store one or more pieces of data and selectively provide access to the one or more pieces of data. As illustrated in FIG. 4, the data storage component 436 may store systems data 438a, plant data 438b, and/or other data. The systems data 438a may generally include data relating to the functionality of the valve 180, such as stored settings, information regarding the location of the valve 180, functionality of various components of the valve 180, and/or the like. The plant data 438b may generally relate to recipes for plant growth, settings of various components within the assembly line grow pod 100 (FIG. 1A), data relating to control of the valve 180, sensor data relating to a particular tray or cart, and/or the like.

It should be understood that while the components in FIG. 4 are illustrated as residing within the valve 180, this is merely an example. In some embodiments, one or more of the components may reside external to the valve 180, such as within the valve control module 300 (FIG. 3). It should also be understood that, while the valve 180 is illustrated as a single device, this is also merely an example. That is, the valve 180 may be a plurality of devices that are communicatively coupled to one another and provide the functionality described herein.

Figure 5:
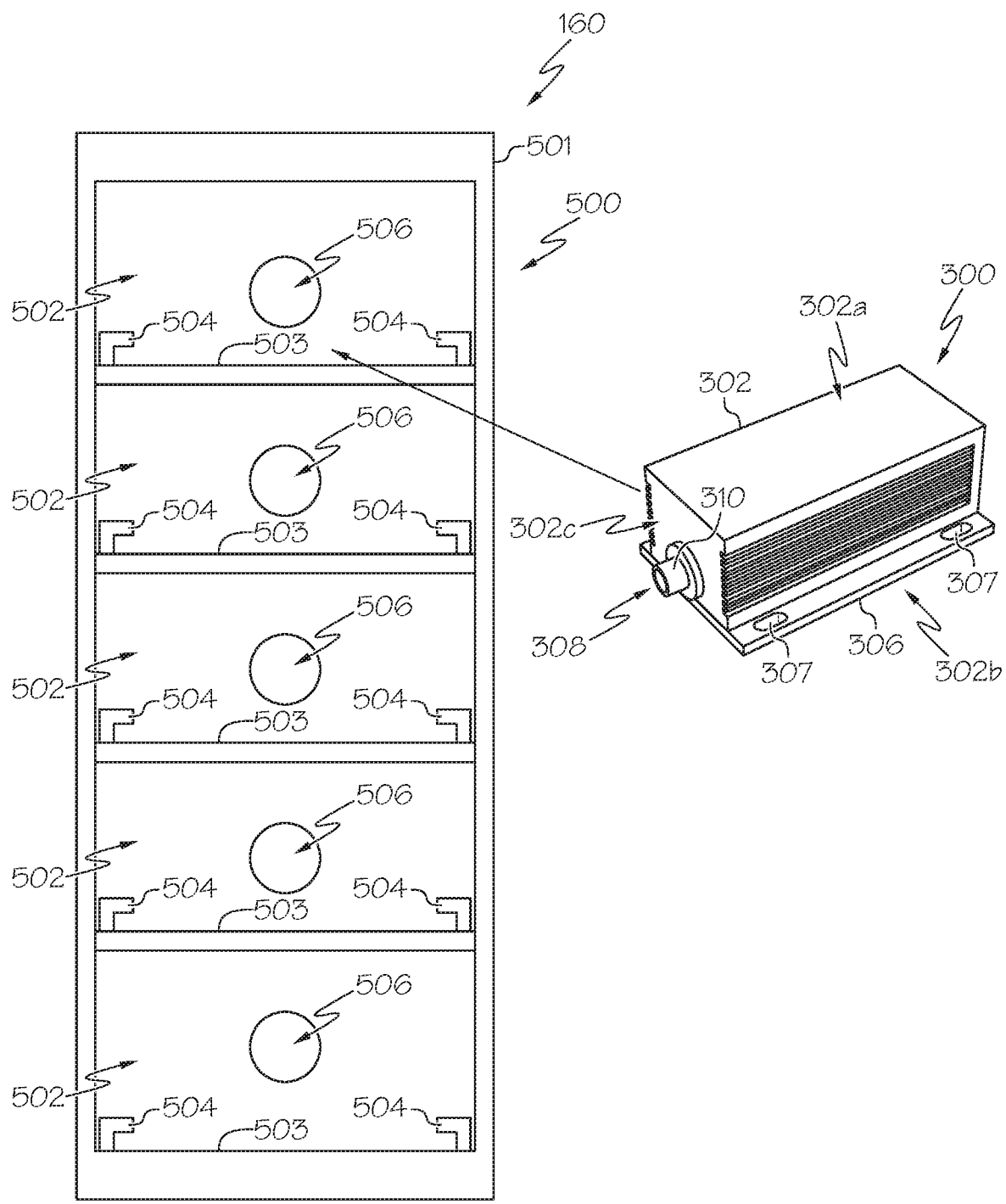
FIG. 5 schematically depicts an illustrative modular control interface of a master controller that receives a valve control module according to one or more embodiments shown and described herein.

FIG. 5 schematically depicts an illustrative modular control interface 500 of a master controller 160 that receives a valve control module 300 according to various embodiments. As illustrated, the master controller 160 may be configured with a modular control interface 500 that can support the valve control module 300 and/or one or more other control modules. As such, the master controller 160 may include a plurality of bays 502 in which the valve control module 300 can be placed. Each bay 502 is generally a cavity within a body 501 of the master controller 160 that is sized and shaped to receive any control module, including the valve control module 300. In addition, each bay 502 may have the same or substantially similar shape and size as the other bays 502 of the master controller 160 such that the valve control module 300 and/or other modules can be inserted in any bay 502. That is, no bay 502 is particularly shaped to only accept the valve control module 300 and there is no bay that cannot accept the valve control module 300.

Figure 6:
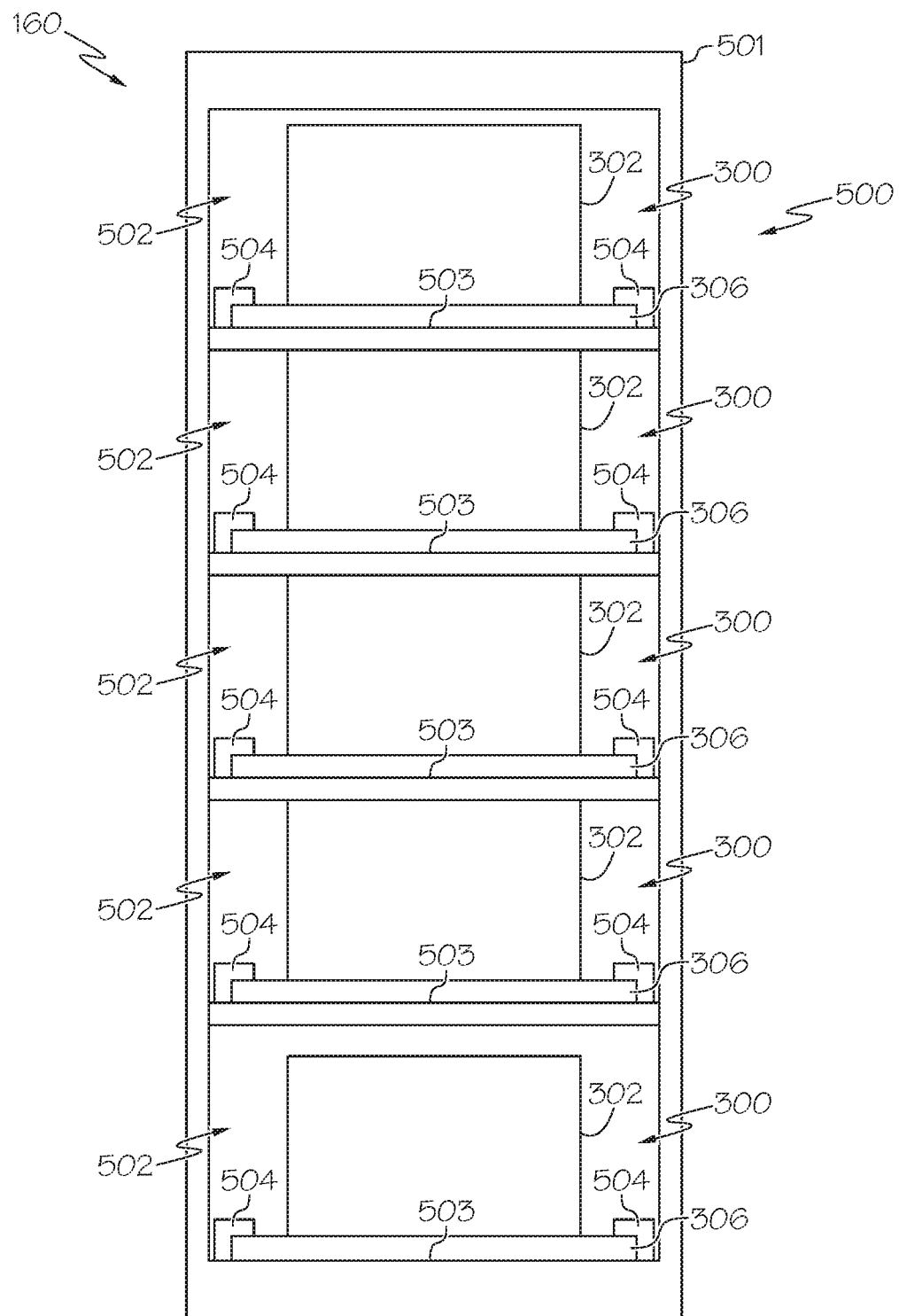
FIG. 6 schematically depicts an illustrative master controller holding a plurality of illustrative control modules according to one or more embodiments shown and described herein.

At least some of the plurality of bays 502 may further include a floor 503 and/or a support mechanism 504. The floor 503 may generally be a lower surface of each bay 502 that supports the valve control module 300 when placed therein. As such, each floor 503 may be part of the body 501 of the master controller 160. In some embodiments, the support mechanism 504 may be a rail or the like that supports the base 306 of the valve control module 300 when the valve control module 300 is inserted into a respective bay. In addition, the support mechanism 504 may also act as a guide to ensure that the valve control module 300 is appropriately inserted and positioned within the bay 502. For example, as depicted in FIG. 6, at least some of the support mechanisms 504 in each bay 502 accepts the corresponding base 306 of the valve control module 300 such that the valve control module 300 slides into the bay 502 in the correct positioning and ensures that the I/O port 308 is appropriately positioned, as described hereinbelow.

Referring again to FIG. 5, the support mechanisms 504 may further be arranged, shaped, and sized to hold the valve control module 300 in place when the valve control module 300 is placed within a bay 502 in some embodiments. In addition, the support mechanisms 504 may further be molded to receive a securing device to secure the valve control module 300 within the bay 502 (e.g., clips, bolts, screws, and/or the like that are inserted into the apertures 307 in the base 306 and affixed to (or integrated with) the support mechanisms 504). It should be understood that the particular arrangement and configuration of the support mechanisms 504 and the bases 306 are merely illustrative and other means of ensuring that the valve control module 300 is appropriately placed and positioned within the bay 502 are possible without departing from the scope of the present disclosure.

Still referring to FIG. 5, at least a portion of the plurality of bays 502 may further include a bay I/O port 506. The bay I/O port 506 may correspond to the I/O port 308 of the valve control module 300 such that the bay I/O port 506 and the I/O port 308 of the valve control module 300 can be matingly coupled together. For example, the bay I/O port 506 may be shaped and/or sized to correspond to the body 310 of the I/O port 308 such that the I/O port 308 is insertable within the bay I/O port 508 (e.g., the bay I/O port 506 is generally the same or substantially similar shape and slightly larger than the body 310 of the I/O port 308). In embodiments, the bay I/O port 506 may contain various communications components such that, when the bay I/O port 506 is mated to the I/O port 308 of the valve control module 300, communications between the valve control module 300 and other devices communicatively coupled via the bay I/O port 506 can occur. For example, the bay I/O port 506 may allow the valve control module 300 to send and/or receive transmissions to/from the various other control modules and/or one or more components of the assembly line grow pod 100 (FIG. 1A) via the I/O port 308.

The circuitry contained within each of the bay I/O ports 506 may be communicatively coupled to various other components of the master controller 160 such that signals, data, and/or the like can be transmitted to the master controller 160, other control modules, and/or one or more components of the assembly line grow pod 100 (FIG. 1A) by the valve control module 300 when the valve control module 300 is inserted in one of the bays 502 of the master controller 160 and the bay I/O port 506 and the I/O port 308 are coupled together.

Figure 7:
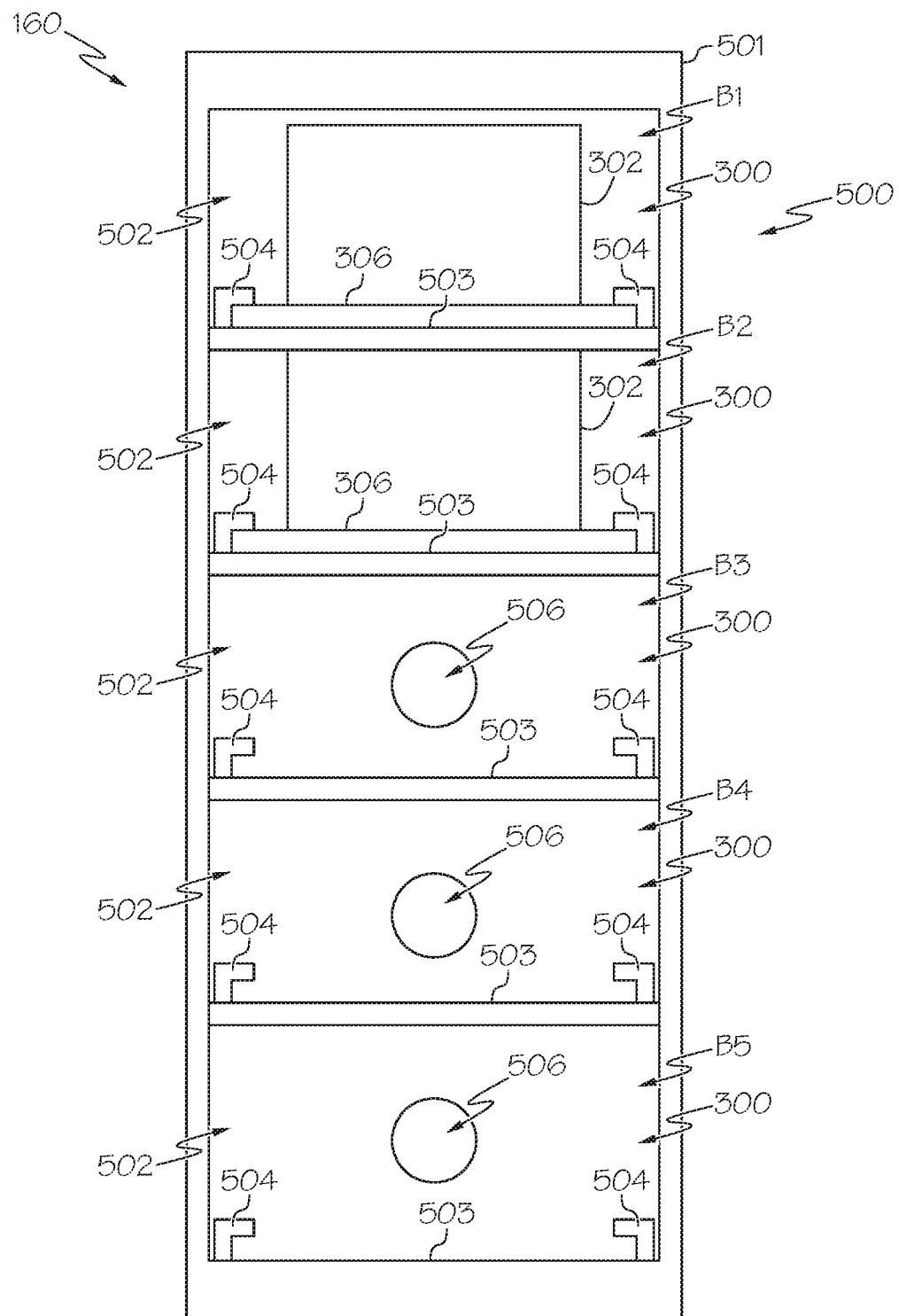
FIG. 7 schematically depicts an illustrative master controller holding a plurality of illustrative control modules and having a plurality of empty bays according to one or more embodiments shown and described herein.

Since at least some of the bays 502 are identical (or substantially similar) in shape and size and contain similar components (e.g., floors 503, support mechanisms 504, and bay I/O ports 506), the valve control module 300 can be placed in any one of the bays 502 in order to operate. Certain bays 502 may remain vacant and ready to accept any control module, as depicted in FIG. 7.

It should be understood that the various components of the master controller 160 described herein allow the valve control module 300 (in addition to other control modules) to be hot swappable (which may also be referred to herein as "removably insertable") within the master controller 160. That is, the valve control module 300 can be inserted into a bay 502 of the master controller 160 at any time to function. Furthermore, removal of the valve control module 300 from a bay 502 will not alter the functionality of other control modules inserted in other bays 502. As such, a user may remove the valve control module 300 from a bay 502 at any time without altering the functionality of the remaining installed control modules. Similarly, another control module may be removed while the valve control module 300 remains in a bay 502 and the valve control module 300 will continue to function as described herein. This may be particularly useful in situations where it may be necessary to remove a control module from a bay 502 without shutting down the entire assembly line grow pod 100 (FIG. 1A) to do so.

It should also be understood that the master controller 160 need not have all of the bays 502 filled with a control module to operate the assembly line grow pod 100. For example, as particularly shown in FIG. 7, a portion of the bays 502 may be "filled" bays (e.g., containing a control module such as the valve control module 300), such as bays B1, B2, and B4 Likewise, a portion of the bays 502 may be "empty" bays (e.g., not containing a control module), such as bays B3 and B4. Even with empty bays B3 and B4, the master controller 160 may still be able to provide all of the functionality for the assembly line grow pod 100 (FIG. 1A), as described herein. Empty bays B3 and B4 may be used to insert future control modules, such as modules that control additional components that are added to the assembly line grow pod 100 (FIG. 1A) and/or modules that increase the efficiency of operation of the assembly line grow pod 100.

Figure 8:
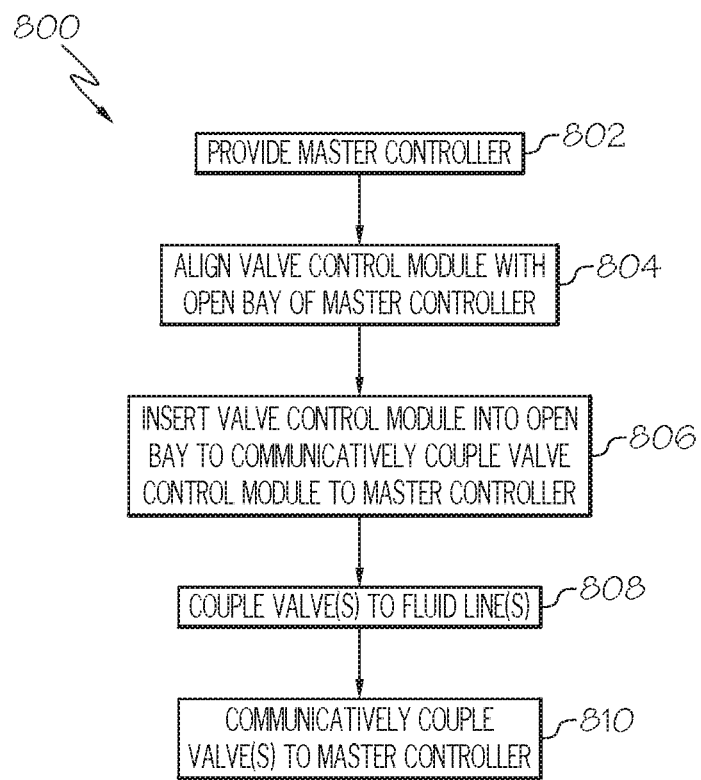
FIG. 8 depicts a flow diagram of an illustrative method of providing a valve control module for a modular control interface and providing one or more valves according to one or more embodiments shown and described herein.

FIG. 8 depicts a flow diagram of an illustrative method of providing a valve control module for a modular control interface and for providing one or more valves, generally designated 800, according to various embodiments. Referring also to FIGS. 1A-5, the method 800 includes providing the assembly line grow pod 100 with the master controller 160 at block 802. At block 804, a valve control module 300 is aligned with an open bay 502 of the master controller 160, as described in greater detail herein. Accordingly, the valve control module 300 is inserted within the open bay 502 of the master controller 160 so as to be communicatively coupled with the master control module at block 806, as described in greater detail herein.

At block 808, the one or more valves 180 may be coupled to one or more fluid lines, including the one or more water lines 110 and the one or more airflow lines 112. For example, the one or more water lines 110 or the one or more airflow lines 112 within the assembly line grow pod 100 may be coupled to the one or more valves 180 in such a manner that a valve 180 receives fluid from a first particular location and selectively controls movement of the fluid to a second particular location. More specifically, a valve 180 may be coupled between the watering component 109 and a water delivery location. A water line 110 may be coupled from the watering component 109 to the valve 180 (e.g., connecting the valve inlet port 384 of the valve 180 to the water line 110) and another water line 110 may be coupled from the valve 180 (e.g., connecting the valve outlet port 386 of the valve 180 to the other water line 110) to the water delivery location. The relative distances between a fluid source, the valve 180, and a fluid destination via the fluid lines (e.g., the water lines 110 and the airflow lines 112) is not limited by this disclosure, and the valve 180 may be placed at any location that allows the valve 180 to selectively restrict movement or redirect movement of fluid, as described herein. For example, it may be advantageous to include the valve 180 nearer to the fluid source or nearer to the fluid destination depending on the characteristics of the fluid, the distance between the fluid source and the fluid destination, the location of other pumps or valves, the location of fluid lines (e.g., a plurality of fluid lines that are received by the fluid source and/or the fluid destination), and/or the like.

In some embodiments, coupling the valve 180 according to block 808 may include placing a plurality of valves 180 in series on a fluid line between the fluid source and the fluid destination. Such a coupling of a plurality of valves 180 in series may be completed, for example, to provide a stepwise movement of fluid, to pressurize fluid, and/or the like. However, other advantages should also be recognized.

In some embodiments, coupling the valve 180 according to block 808 may include placing a plurality of valves 180 in parallel on a plurality of fluid lines between the fluid source and the fluid destination. Such a coupling of a plurality of valves 180 in parallel may be completed, for example, to selectively control a fluid direction between a fluid source and a fluid destination, to provide additional fluid paths when a relatively larger amount of fluid is needed, to provide fewer fluid paths when a relatively smaller amount of fluid is needed, and/or the like. Other advantages should also be recognized.

In some embodiments, coupling the valve 180 according to block 808 may also be completed such that the valve 180 is coupled relative to other components of the assembly line grow pod 100. For example, to ensure that fluid is received such that it can routed to a particular direction, a valve 180 may be coupled with or adjacent to one or more pumps 150 that are used for pumping the fluid. In some embodiments, coupling the valve 180 according to block 808 may be completed according to certain characteristics of the assembly line grow pod 100 and/or components thereof. For example, if a main water line 110 extends from a fluid source and a plurality of fluid destinations are present, at least one valve 180 may be positioned at the main water line 110 and/or at a branch water line 110 between the main water line 110 and water lines 110 traveling to each fluid destination so as to selectively provide fluid flow from the main water line 110 to the fluid destinations.

At block 810, each of the installed valves 180 within the assembly line grow pod 100 may be communicatively coupled to the master controller 160, particularly the valve control module 300 therein. As previously described herein, the valves 180 (and/or a portion thereof, such as the hardware components within the housing 380) may be communicatively coupled (either via a wired or wireless connection) to the valve control module 300 (e.g., via the network interface hardware 434 of the valve 180 and a similar component within the valve control module 300). In some embodiments, the valves 180 may be directly coupled to the valve control module 300. In other embodiments, the valves 180 may be coupled to the valve control module 300 via a network (e.g., communications network 350).

In embodiments including a series of valves 180 (e.g., a plurality of pumps fluidly coupled in series to one another via fluid lines), each valve 180 may be communicatively coupled in series to the valve control module 300 such that a first valve 180 is communicatively coupled to the valve control module 300, a second valve 180 is communicatively coupled to the first valve 180, and so on. In addition, when a plurality of valves 180 are arranged in series on a fluid line, the valves 180 may be communicatively coupled to the valve control module 300 such that the valve control module 300 can control simultaneous (or substantially simultaneous) operation of the valves 180 to ensure an effective series valve control.

For example, the valve control module 300, a first valve 180, and a second valve 180 (which are arranged in series) may be communicatively coupled such that the valve control module 300 transmits one or more signals to cause an opening/closing of the first valve 180, which opens/closes accordingly and results in a second signal transmitted to the second valve 180 (either from the first valve 180 or the valve control module 300) to open/close in accordance with as the first valve 180, opposite to the open/close setting of the first valve 180, and/or the like to effectively direct fluid movement.

Figure 9:
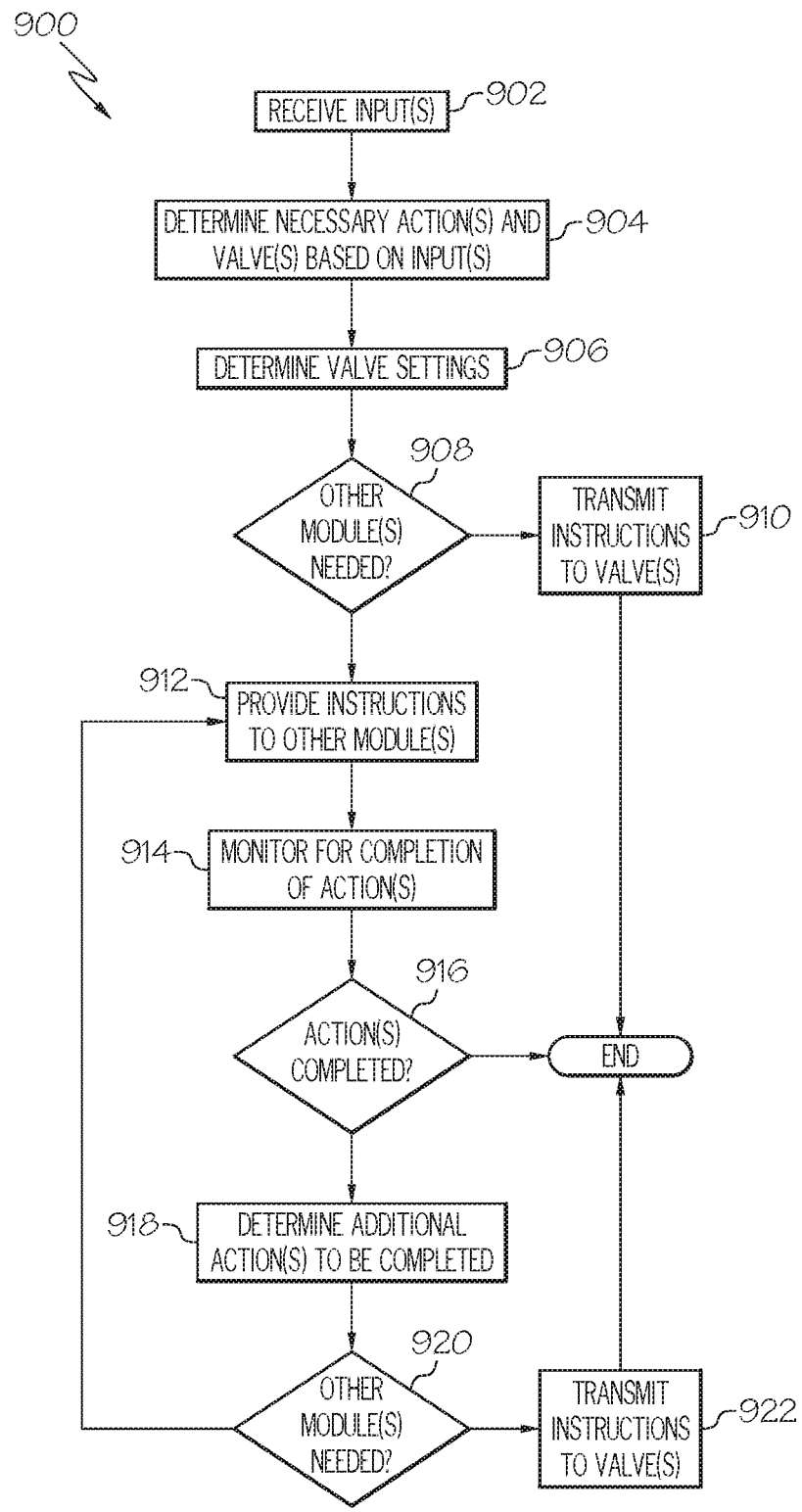
FIG. 9 depicts a flow diagram of an illustrative method of operating one or more valves in an assembly line grow pod with a master controller according to one or more embodiments shown and described herein.

Once inserted within the master controller 160, the valve control module 300 may complete one or more processes to operate the assembly line grow pod 100 and/or a component thereof, (e.g., operate the one or more valves 180). FIG. 9 depicts a flow diagram of an illustrative method of operating an assembly line grow pod 100 with a master controller 160 (e.g., with a valve control module 300 within the master controller 160), generally designated 900, according to one or more embodiments. While FIG. 9 relates to operation of the master controller 160, it should be understood that the various processes may be completed by one or more control modules within the master controller 160 (e.g., the valve control module 300) and/or by the various internal components within each valve 180 (e.g., components within the housing 380 of the valve 180).

At block 902, the master controller 160 may receive one or more inputs. The one or more inputs may generally contain information regarding fluid movement within the assembly line grow pod. For example, the master controller 160 may receive a command from a user, data from one or more sensors, an input from another control device, and/or the like. Illustrative examples of one or more inputs include, but are not limited to, inputs that relate to commands to open or close a particular valve 180 at a particular time, inputs that relate to commands to carry out a particular recipe as it pertains to directing fluid flow, inputs that relate to commands to change various valve settings, sensor inputs from various sensors regarding the status of the assembly line grow pod 100, components thereof, and/or plants growing within the grow pod, inputs relating to commands from other control devices, and/or the like.

At block 904, the master controller 160 determines the actions to be completed and which of the one or more valves 180 are to be used based on the inputs that were received at block 902. The actions may generally be one or more instructions, signals (e.g., control signals), or the like for operation of the one or more valves 180 (e.g., opening or closing one or more inlets and/or one or more outlets, and/or the like).

For example, if the input relates to a command to start placement of seeds on a particular tray, the master controller 160 may determine that the actions include transmitting one or more signals to the valves that direct water movement to watering devices located adjacent to a track so that the watering devices have enough water to water the new seeds when the seeds pass the watering devices on the track after placement. In some embodiments, such actions may also be completed by a plurality of control modules located within the master controller 160. For example, a seeder control module may be inserted in a bay 502 of the master controller 160, and thus an action that corresponds to supplying water to a watering device after seed placement may optionally be controlled by the seeder control module in addition to the valve control module 300.

At block 906, various settings may be determined by the master controller 160. That is, the type of valve 180, the functionality of the valve 180, the location of the valve 180, location of adjacent valves 180, direction of fluid lines extending to and from the valve 180, various valve 180 parameters (e.g., number of valve inputs, number of valve outputs, type of actuator, etc.) may be determined for the purposes of determining how the valve 180 will be used to direct fluid having particular delivery characteristics. For example, the type of valve (e.g., water valve, compressed air valve, etc.) may be determined for the purposes of determining the type of fluid to be directed. The location of the valve 180 and/or the location of adjacent valves 180 may be determined for the purposes of determining where in the assembly line grow pod 100 fluid can be directed and/or how the fluid can be directed by the valves 180. The various valve parameters may be determined for the purposes of determining how fluid can be directed a particular area in a particular amount of time, whether fluid flow can be reversed, and/or the like. As a result of determining valve settings, the master controller 160 can determine how best to utilize a particular valve 180 to complete various opening and closing tasks for directing fluid movement within the assembly line grow pod 100.

In addition to determining valve settings for the purposes of utilizing particular valves 180, the master controller 160 may determine whether other module(s) for controlling actions are needed in addition to the valve control module 300 at block 908. Such a determination may be completed, for example, by recognizing certain module(s) that can complete a particular action that may work in conjunction with the valve control module 300 and/or the valves 180 to complete an action. For example, a pump control module and/or one or more pumps 150 may be used in conjunction with the valve control module 300 and/or one or more valves 180 to initiate, increase, decrease, or stop fluid flow, pressurize fluid, and/or the like. In some embodiments, the determination at block 908 may also include determining whether particular other modules within the master controller 160 are available. If no other module(s) are needed or available to control the actions, the process may continue at block 910. If other module(s) are needed or available to control the actions, the process may continue at block 912.

At block 910, the master controller 160 (and/or the valve control module 300 therein) may transmit instructions to the valve(s) 180 and no other module(s) are needed or available to complete the actions. More specifically, the master controller 160 may transmit instructions corresponding to operation of the valve(s) 180 that will result in direction of fluid as needed. As a result, each valve 180 that receives the instructions from the master controller 160 may direct movement of the various valve components as described herein.

At block 912, instructions are provided to the other module(s) (e.g., other than the valve control module 300) for carrying out the determined action(s). For example, the master controller 160 may transmit one or more signals to the other module(s), where the one or more signals correspond to the command. That is, if a pump needs to be operated (e.g., to move fluid) in conjunction with operation of a particular valve, the master controller 160 may transmit one or more signals to a pump control module such that the pump control module directs operation of the pump and causes the valve(s) 180 to function as described herein.

In addition, the master controller 160 may monitor one or more portions of the assembly line grow pod 100 to ensure the action(s) are completed by the other modules and/or components of the assembly line grow pod 100 at block 914. That is, the master controller 160 may receive signals and/or data from sensors, from portions of the assembly line grow pod 100, from the control modules, and/or the like that are indicative of whether the action(s) were completed. For example, if an action included closing a particular valve 180, the master controller 160 may receive sensor data from sensors at the valve 180 or downstream from the valve 180, where the sensor data indicates whether a flow of water from the valve 180 exists. Data indicating that a water flow does exist may be used by the master controller 160 to determine that the valve 180 was not closed. As such, the master controller 160 may determine at block 916 whether the action(s) were completed. If the actions were completed, the process may end. If the actions were not completed, the process may proceed to block 918.

At block 918, the master controller 160 may determine additional action(s) to be completed. These additional actions may generally be actions to replace those that were not completed above. As such, the action(s) may be the same or substantially similar (e.g., transmitting a signal to a valve corresponding to a command to close the valve) in some embodiments. However, the actions may also be different in other embodiments (e.g., transmitting a signal to one or more pumps and/or one or more other valves). For example, new actions may be determined if only a portion of the actions were carried out. In another example, new alternative actions may be determined if the failure to carry out an action was due to a faulty component, thus necessitating the need for a redundant system to carry out particular actions. Accordingly, the master controller 160 may determine again whether these new actions are to be completed by other control modules within the master controller 160. If so, the process may repeat at block 912. If not, the master controller 160 may complete the actions at block 922 (e.g., transmit instructions to one or more pumps and/or the like) and the process may end.

As illustrated above, various embodiments for providing one or more valves and for providing a valve control module for a modular control interface in an assembly line grow pod are disclosed. These embodiments create a particular valve system that is adapted to direct fluid movement within an assembly line grow pod in an accurate and controlled manner so as to ensure that precise placement of fluid (including water, nutrients, and ambient air conditions) is achieved to ensure accurate growth of plants growing inside the assembly line grow pod.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein, It should now be understood that embodiments disclosed herein include systems, methods, and non-transitory computer-readable mediums for providing a valve control module for a modular control interface in an assembly line grow pod and for providing one or more valves within an assembly line grow pod for the purposes of directing fluid flow, pressurizing fluid, and/or the like within the assembly line grow pod. It should also be understood that these embodiments are merely exemplary and are not intended to limit the scope of this disclosure.

What is claimed is:
1. An assembly line grow pod comprising:
a plurality of fluid lines fluidly coupled between a fluid source and a fluid destination within the assembly line grow pod;
a plurality of valves, each valve of the plurality of valves fluidly coupled to a fluid line of the plurality of fluid lines such that fluid movement through the plurality of fluid lines is selectively controlled by the plurality of valves; and a master controller communicatively coupled to the plurality of valves, wherein the master controller is programmed to receive a recipe relating to a predetermined amount of fluid to be delivered to a particular plant at a predetermined location within the assembly line grow pod, determine one or more valves of the plurality of valves to direct the predetermined amount of fluid to the location, determine valve parameters for each of the one or more valves that achieve the fluid direction, and transmit one or more control signals to the one or more valves for directing the predetermined amount of fluid within the assembly line grow pod according to the recipe.

2. The assembly line grow pod of claim 1, further comprising a valve control module disposed within the master controller, the valve control module comprising one or more hardware components for receiving the recipe, determining the one or more valves, determining the valve parameters, and transmitting the one or more control signals.

3. The assembly line grow pod of claim 2, wherein the valve control module is removably insertable such that the valve control module is removable from a bay of the master controller without altering a functionality of the plurality of valves within the assembly line grow pod.

4. The assembly line grow pod of claim 2, wherein the valve control module is fixed within a bay of the master controller such that the valve control module is not removable from the master controller.

5. The assembly line grow pod of claim 1, wherein:
each valve of the plurality of valves comprises at least one valve inlet port, at least one valve outlet port, and an actuator;
the actuator is actuable to selectively control fluid flow from the at least one valve inlet port to the at least one valve outlet port; and
the at least one valve inlet port and the at least one valve outlet port are each fluidly coupled to a fluid line of the plurality of fluid lines.

6. The assembly line grow pod of claim 1, wherein the plurality of fluid lines comprise a plurality of water lines.

7. The assembly line grow pod of claim 1, wherein the plurality of fluid lines comprise a plurality of airflow lines.

8. The assembly line grow pod of claim 1, wherein the master controller is communicatively coupled to the plurality of valves via a communications network.

9. The assembly line grow pod of claim 1, wherein the fluid source is a fluid holding tank containing one or more of the following: water, a mixture of water and nutrients, nutrients, or gasses.

10. The assembly line grow pod of claim 1, wherein the fluid source is a watering component that supplies one or more of the following: water and nutrients to plants that are grown in the assembly line grow pod.

11. The assembly line grow pod of claim 1, wherein the fluid destination includes a watering manifold that supplies water to one or more seed trays supported on a cart within the assembly line grow pod.

12. A valve in an assembly line grow pod, the valve comprising:

a valve inlet port fluidly coupled to an assembly line grow pod fluid source via a first one or more fluid lines disposed between the valve inlet port and the assembly line grow pod fluid source;

a valve outlet port fluidly coupled to an assembly line grow pod fluid destination via a second one or more fluid lines disposed between the valve outlet port and the fluid destination, the valve outlet port further fluidly coupled to the valve inlet port;

an actuator disposed between the valve inlet port and the valve outlet port such that the actuator actuates to selectively control fluid flow in a fluid path between the valve inlet port and the valve outlet port; and a housing comprising:
a processing device communicatively coupled to the actuator and to a master controller of the assembly line grow pod, and
a non-transitory, processor-readable storage medium communicatively coupled to the processing device, the non-transitory, processor-readable storage medium comprising one or more instructions thereon that, when executed, cause the processing device to:
receive an instruction from the master controller, the instruction relating to a predetermined amount of fluid and a predetermined location of fluid delivery within the assembly line grow pod as determined by the master controller according to a recipe and based on fluid needs of a particular plant, and
cause the actuator to open or close the fluid path between the valve inlet port and the valve outlet port in accordance with the instruction to direct the predetermined amount of fluid.

13. The valve of claim 12, wherein:
the processing device is communicatively coupled to a valve control module of the master controller; and
the one or more instructions from the non-transitory, processor-readable storage medium that, when executed, cause the processing device to receive the instruction further cause the processing device to receive the instruction from the valve control module of the master controller.

14. The valve of claim 12, wherein the valve outlet port and the valve inlet port are each fluidly coupled to one or more water lines.

15. The valve of claim 12, wherein the valve outlet port and the valve inlet port are each fluidly coupled to one or more airflow lines.

16. The valve of claim 12, wherein the actuator includes at least one of the following: a pneumatic actuator, a hydraulic actuator, or an electric actuator.

17. The valve of claim 12, further comprising a second valve inlet port fluidly coupled to a third fluid line of the one or more fluid lines, the second valve inlet port fluidly coupled to the valve inlet port and the valve outlet port.

18. The valve of claim 12, further comprising a second valve outlet port fluidly coupled to a third fluid line of the one or more fluid lines, the second valve outlet port fluidly coupled to the valve inlet port and the valve outlet port.

* * * * *